(12) United States Patent
Banning et al.

(10) Patent No.: US 7,294,730 B2
(45) Date of Patent: Nov. 13, 2007

(54) COLORANT COMPOUNDS

(75) Inventors: Jeffrey H. Banning, Hillsboro, OR (US); Bo Wu, Wilsonville, OR (US); C Wayne Jaeger, Birkenfeld, OR (US)

(73) Assignee: Xerox Corporation, Stamford, CT (US)

( * ) Notice: Subject to any disclaimer, the term of this patent is extended or adjusted under 35 U.S.C. 154(b) by 149 days.

(21) Appl. No.: 11/291,056

(22) Filed: Nov. 30, 2005

(65) Prior Publication Data

US 2007/0123701 A1    May 31, 2007

(51) Int. Cl.
  C07F 7/00    (2006.01)
  C07F 5/00    (2006.01)
  C07F 13/00   (2006.01)
  C09B 62/00   (2006.01)

(52) U.S. Cl. .................. 556/56; 556/45; 556/57; 548/105; 534/15; 534/619

(58) Field of Classification Search ............... 534/15, 534/619; 556/45, 56, 57; 548/105
See application file for complete search history.

(56) References Cited

U.S. PATENT DOCUMENTS

| | | | |
|---|---|---|---|
| 3,653,932 A | | 4/1972 | Berry et al. |
| 4,390,369 A | | 6/1983 | Merritt et al. |
| 4,432,898 A | * | 2/1984 | Back et al. .................. 534/623 |
| 4,484,948 A | | 11/1984 | Merritt et al. |
| 4,684,956 A | | 8/1987 | Ball |
| 4,851,045 A | | 7/1989 | Taniguchi |
| 4,889,560 A | | 12/1989 | Jaeger et al. |
| 4,889,761 A | | 12/1989 | Titterington et al. |
| 5,006,170 A | | 4/1991 | Schwarz et al. |
| 5,151,120 A | | 9/1992 | You et al. |
| 5,372,852 A | | 12/1994 | Titterington et al. |
| 5,496,879 A | | 3/1996 | Griebel et al. |
| 5,621,022 A | | 4/1997 | Jaeger et al. |
| 6,147,140 A | | 11/2000 | Jaeger et al. |

FOREIGN PATENT DOCUMENTS

| | | | |
|---|---|---|---|
| DE | 199 05 279 A1 | * | 8/2000 |
| EP | 0 206 286 B1 | | 5/1990 |
| EP | 0 187 352 B1 | | 6/1991 |
| EP | 0519138 A2 | | 12/1992 |
| EP | 1 524 302 A1 | * | 4/2005 |
| JP | 50-156541 | * | 12/1975 |
| JP | 11-2925 | * | 1/1999 |
| JP | 11-5931 | * | 1/1999 |
| JP | 2001-316600 | * | 11/2001 |
| JP | 2004-99761 | * | 4/2004 |

(Continued)

OTHER PUBLICATIONS

Copending U.S. Appl. No. 11/126,745, filed May 11, 2005, entitled "Method of Purification of Polyalkylene Materials," by San-Ming Yang et al.

(Continued)

*Primary Examiner*—Porfirio Nazario-Gonzalez
(74) *Attorney, Agent, or Firm*—Judith L. Byorick

(57) ABSTRACT

Disclosed are colorant compounds of the formulae

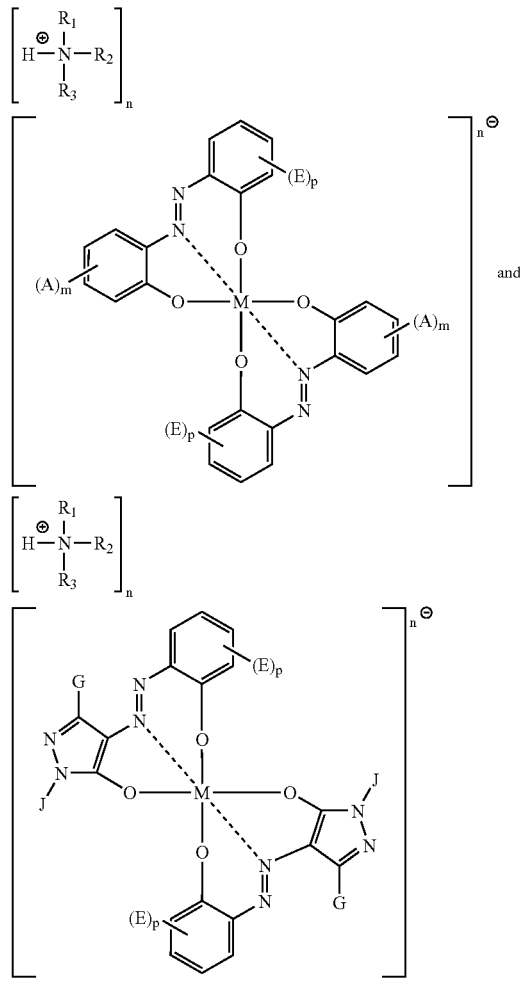

wherein $R_1$, $R_2$, $R_3$, M, A, E, G, J, m, n, and p are as defined herein.

49 Claims, No Drawings

FOREIGN PATENT DOCUMENTS

WO     WO 94/04619     3/1994

OTHER PUBLICATIONS

Copending U.S. Appl. No. 11/290,221, filed nov. 30, 2005, entitled "Phase Change Inks," by Bo Wu et al.

Copending U.S. Appl. No. 11/291,055, filed Nov. 30, 2005, entitled "Phase Change Inks," by Bo Wu et al.

Copending U.S. Appl. No. 11/290,263, filed Nov. 30, 2005, entitled "Phase Change Inks," by Bo Wu et al.

Copending U.S. Appl. No. 11/291,057, filed Nov. 30, 2005, entitled "Phase Change Inks," by Jeffery H. Banning et al.

Copending U.S. Appl. No. 11/290,258, filed Nov. 30, 2005, entitled "Phase Change Inks Containing Specific Colorants," by Bo Wu et al.

Copending U.S. Appl. No. 11/290,265, filed Nov. 30, 2005, entitled "Phase Change Inks," Trevor J. Snyder et al.

Copending U.S. Appl. No. 11/290,222, filed Nov. 30, 2005, entitled "Phase Change Inks Containing Fischer-Tropsch Waxes," by Bo Wu et al.

English abstract for German Patent Publication DE 4205636AL.

English abstract for German Patent Publication DE4205713AL.

* cited by examiner

COLORANT COMPOUNDS

CROSS-REFERENCE TO RELATED APPLICATIONS

Copending U.S. application Ser. No. 11/126,745, filed May 11, 2005, entitled "Method of Purification of Polyalkylene Materials," with the named inventors San-Ming Yang, Thomas E. Enright, Val Magdalinis, Ahmed Alzamly, Man C. Tam, Carol A. Jennings, Peter M. Kazmaier, and Marko D. Saban, the disclosure of which is totally incorporated herein by reference, discloses a method of purifying polyalkylene. Also included are microencapsulated Gyricon beads, phase change ink, and toners comprising the purified polyalkylene.

Copending U.S. application Ser. No. 11/290,221, U.S. Patent Publication 20070120911, filed concurrently herewith, entitled "Phase Change Inks," with the named inventors Bo Wu, Stephan V. Drappel, Trevor J. Snyder, Donald R. Titterington, Jule W. Thomas, Jr., C. Geoffrey Allen, Harold R. Frame, and Wolfgang G. Wedler, the disclosure of which is totally incorporated herein by reference, discloses a phase change ink comprising (a) a colorant and (b) a phase change ink carrier, said carrier comprising (i) a branched triamide and (ii) a polyethylene wax having an average peak molecular weight of from about 350 to about 730, a polydispersity of from about 1.03 to about 3.0, and an asymmetrical molecular weight distribution skewed toward the high molecular weight end. Also disclosed is a process which comprises (1) incorporating into an ink jet printing apparatus a phase change ink comprising (a) a colorant and (b) a phase change ink carrier, said carrier comprising (i) a branched triamide and (ii) a polyethylene wax having an average peak molecular weight of from about 350 to about 730, a polydispersity of from about 1.03 to about 3.0, and an asymmetrical molecular weight distribution skewed toward the high molecular weight end; (2) melting the ink; and (3) causing droplets of the melted ink to be ejected in an imagewise pattern onto a substrate.

Copending U.S. application Ser. No. 11/291,055. U.S. Patent Publication 20070120917, filed concurrently herewith, entitled "Phase Change Inks," with the named inventors Bo Wu, Trevor J. Snyder, Stephan V. Drappel, Jule W. Thomas, Jr., Donald R. Titterington, and C. Geoffrey Allen, the disclosure of which is totally incorporated herein by reference, discloses a phase change ink comprising (a) a colorant and (b) a phase change ink carrier, said carrier comprising (i) a branched triamide and (ii) a polyethylene wax having an average peak molecular weight of from about 350 to about 730 and a polydispersity of from about 1.05 to about 3.0. Also disclosed is a process which comprises (1) incorporating into an ink jet printing apparatus a phase change ink comprising (a) a colorant and (b) a phase change ink carrier, said carrier comprising (i) a branched triamide and (ii) a polyethylene wax having an average peak molecular weight of from about 350 to about 730 and a polydispersity of from about 1.05 to about 3.0; (2) melting the ink; and (3) causing droplets of the melted ink to be ejected in an imagewise pattern onto a substrate.

Copending U.S. application Ser. No. 11/290,263 U.S. Patent Publication 20070120916, filed concurrently herewith, entitled "Phase Change Inks," with the named inventors Bo Wu, Trevor J. Snyder, Jule W. Thomas, Jr., and Patricia Ann Wang, the disclosure of which is totally incorporated herein by reference, discloses a phase change ink comprising (a) a colorant and (b) a phase change ink carrier, said carrier comprising (i) a branched triamide and (ii) a polyethylene wax having an average peak molecular weight of from about 350 to about 730 and a polydispersity of from about 1.0001 to about 1.500. Also disclosed is a process which comprises (1) incorporating into an ink jet printing apparatus a phase change ink comprising (a) a colorant and (b) a phase change ink carrier, said carrier comprising (i) a branched triamide and (ii) a polyethylene wax having an average peak molecular weight of from about 350 to about 730 and a polydispersity of from about 1.0001 to about 1.500; (2) melting the ink; and (3) causing droplets of the melted ink to be ejected in an imagewise pattern onto a substrate.

Copending U.S. application Ser. No. 11/291,057 U.S. Patent Publication 20070120918, filed concurrently herewith, entitled "Phase Change Inks," with the named inventors Jeffery H. Banning, Bo Wu, and C. Wayne Jaeger, the disclosure of which is totally incorporated herein by reference, discloses a phase change ink composition comprising a phase change ink carrier and a colorant compound of the formula

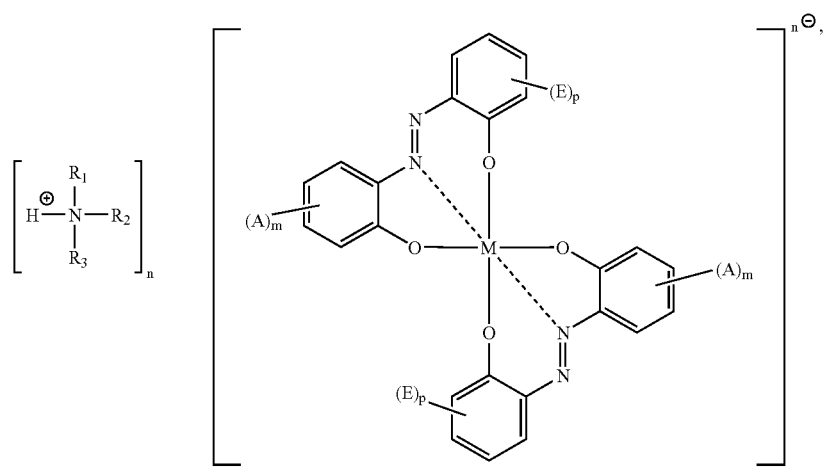

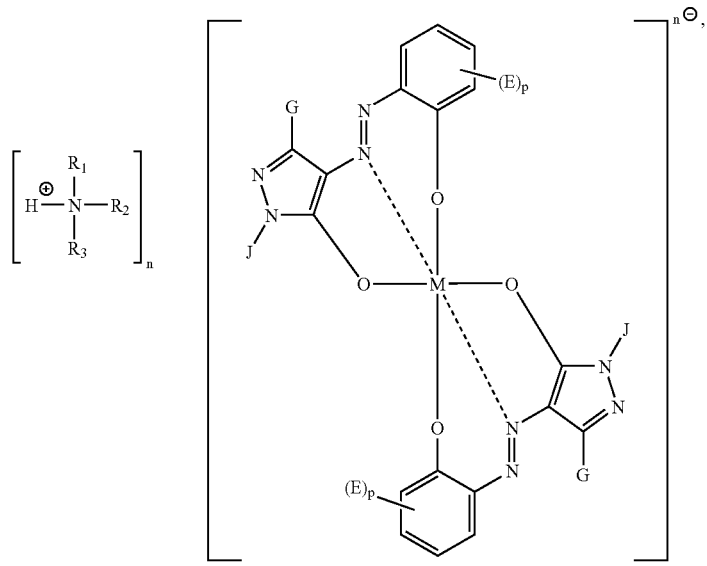

or mixtures thereof, wherein $R_1$, $R_2$, $R_3$, M, A, F, G, J, m, n, and p are as defined therein.

Copending U.S. application Ser. No. 11/290,258, U.S. Patent Publication 20070120915, filed concurrently herewith, entitled "Phase Change Inks Containing Specific Colorants," with the named inventors Bo Wu, Trevor J. Snyder, Jeffery H. Banning, and Jule W. Thomas, Jr., the disclosure of which is totally incorporated herein by reference, discloses a phase change ink composition comprising (a) a phase change ink carrier comprising (1) an amide; and (2) a polyethylene wax having an average peak molecular weight of from about 350 to about 730 and a polydispersity of from about 1,0001 to about 15; and (b) a colorant compound of the formula

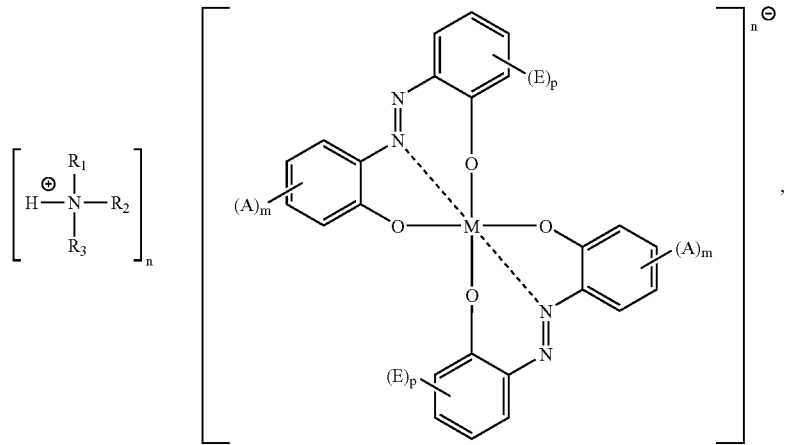

-continued

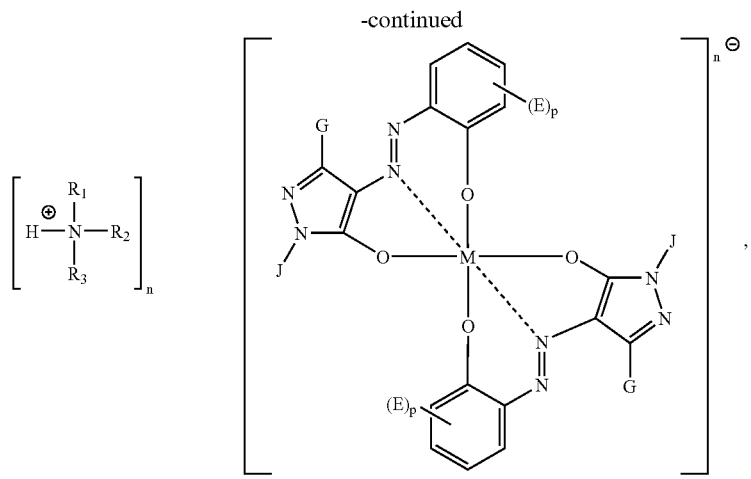

or mixtures thereof, wherein $R_1$, $R_2$, $R_3$, M, A. F. G, J, m, n, and p are as defined therein.

Copending U.S. application Ser. No. 11/290,265, U.S. Patent Publication 20070120927, filed concurrently herewith, entitled "Phase Change Inks," with the named inventors Trevor J. Snyder, Bo Wu, Patricia Ann Wang, Donald R. Titterington, Jule W. Thomas, Jr., Randall R. Bridgeman, and Mark H. Tennant the disclosure of which is totally incorporated herein by reference, discloses a phase change ink composition comprising an ink carrier and a colorant said ink being suitable for use in an indirect printing process wherein the ink is jetted from a printhead onto a heated intermediate transfer member and subsequently transferred from the intermediate transfer member to a final recording substrate, wherein: (a) the ink can be jetted from the printhead onto the intermediate transfer member when the ink is maintained at a temperature of about 125° C. or lower; (b) the ink can be jetted without purging from a printer maintained at a standby temperature of about 100° C. or lower; and (c) the ink has a cohesive failure temperature of at least about 54° C.

Copending U.S. application Ser. No. 11/290,222 U.S. Patent Publication 20070120914, filed concurrently herewith, entitled "Phase Change Inks Containing Fischer-Tropsch Waxes," with the named inventors Bo Wu, Patricia Ann Wang, Trevor J. Snyder, and Jule W. Thomas, Jr., the disclosure of which is totally incorporated herein by reference, discloses a phase change ink comprising (a) a colorant and (b) a phase change ink carrier, said carrier comprising (i) an amide and (ii) a Fischer-Tropsch wax having an average peak molecular weight of from about 300 to about 800 and a polydispersity of from about 1.001 to about 3. Also disclosed is a process which comprises (1) incorporating into an ink jet printing apparatus a phase change ink comprising (a) a colorant and (b) a phase change ink carrier, said carrier comprising (i) an amide and (ii) a Fischer-Tropsch wax having an average peak molecular weight of from about 300 to about 800 and a polydispersity of from about 1.001 to about 3; (2) melting the ink; and (3) causing droplets of the melted ink to be ejected in an imagewise pattern onto a substrate.

BACKGROUND

Disclosed herein are colorant compounds. More specifically, disclosed herein are colorant compounds particularly suitable for use in hot melt or phase change inks. One embodiment is directed to colorant compounds of the formulae

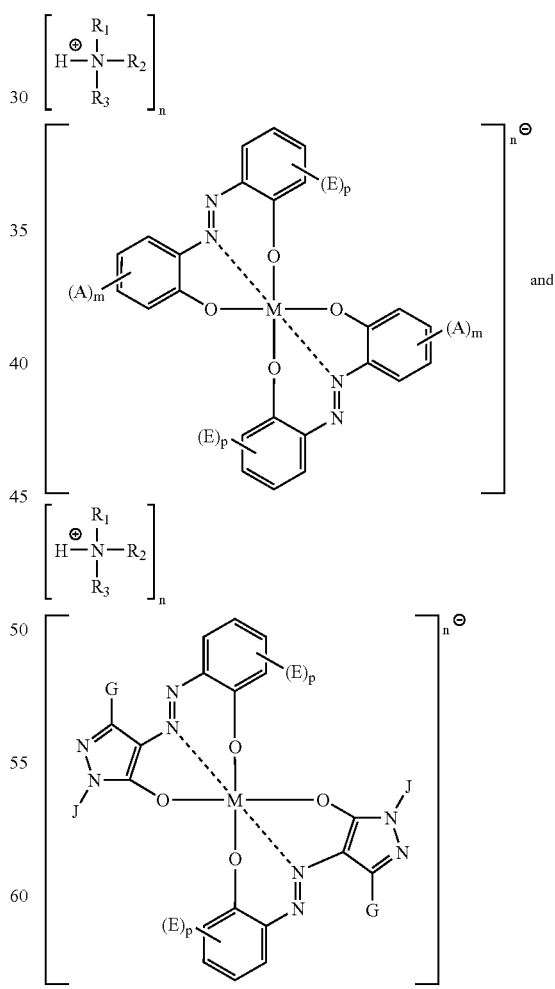

wherein $R_1$, $R_2$, and $R_3$ each, independently of the others, is a hydrogen atom, an alkyl group, including linear and branched, saturated and unsaturated, cyclic and acyclic, and substituted and unsubstituted alkyl groups, and wherein hetero atoms either may or may not be present in the alkyl group, an arylalkyl group, including substituted and unsubstituted arylalkyl groups, wherein the alkyl portion of the arylalkyl group can be linear or branched, saturated or unsaturated, cyclic or acyclic, and substituted or unsubstituted, and wherein hetero atoms either may or may not be present in either the aryl or the alkyl portion of the arylalkyl group, or an alkylaryl group, including substituted and unsubstituted alkylaryl groups, wherein the alkyl portion of the alkylaryl group can be linear or branched, saturated or unsaturated, cyclic or acyclic, and substituted or unsubstituted, and wherein hetero atoms either may or may not be present in either the aryl or the alkyl portion of the alkylaryl group, provided that the total number of carbon atoms and hetero atoms, excluding atoms in any substituents, in $R_1+R_2+R_3$ is at least about 18, M is a metal atom, each A, each E, and each G, independently of the other, represents a substituent on a phenyl or pyrazolone ring, wherein G can also be a hydrogen atom, m is an integer of 0, 1, or 2, p is an integer of 0, 1, 2, 3, or 4, J represents (i) a hydrogen atom, (ii) an alkyl group (including linear and branched, saturated and unsaturated, cyclic and acyclic, and substituted and unsubstituted alkyl groups, and wherein hetero atoms either may or may not be present in the alkyl group), (iii) an aryl group (including substituted and unsubstituted aryl groups, and wherein hetero atoms either may or may not be present in the aryl group), (iv) an arylalkyl group. (including substituted and unsubstituted arylalkyl groups, wherein the alkyl portion of the arylalkyl group can be linear or branched, saturated or unsaturated, and cyclic or acyclic, and wherein hetero atoms either may or may not be present in either the aryl or the alkyl portion of the arylalkyl group), or (v) an alkylaryl group (including substituted and unsubstituted alkylaryl groups, wherein the alkyl portion of the alkylaryl group can be linear or branched, saturated or unsaturated, and cyclic or acyclic, and wherein hetero atoms either may or may not be present in either the aryl or the alkyl portion of the alkylaryl group), wherein two or more substituents on the phenyl or pyrazolone rings can be joined together to form a ring, and n represents an integer of 1, 2, or 3.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. Nos. 4,889,560, 4,889,761, and 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labelling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. Nos. 3,653,932, 4,390,369, 4,484,948, 4,684,956, 4,851,045, 4,889,560, 5,006,170, 5,151,120, 5,372,852, 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

U.S. Pat. No. 6,147,140 (Jaeger et al.), the disclosure of which is totally incorporated herein by reference, discloses a phase change ink composition comprising a phase change ink carrier system in combination with a compatible colorant system, the colorant system comprising a combination of (1) a black colorant having an absorbance in the 475 nanometer region which is less than 80 percent of the absorbance at the 580 nanometer region and (2) a sufficient amount of at least one other colorant having an absorbance in the 475 nanometer region whereby the colorant has a ratio of absorbance in the 475 nanometer region to the 580 nanometer region from about 0.92:1.0 to about 1.01:1.0.

While known compositions and processes are suitable for their intended purposes, a need remains for improved colorant compounds. In addition, a need remains for colorant compounds particularly suitable for use in phase change inks. Further, a need remains for colorant compounds with a desirable degree of thermal stability. Additionally, a need remains for colorant compounds that exhibit a desirable degree of solubility in vehicles employed in phase change inks. There is also a need for colorant compounds that are compatible with phase change ink vehicles capable of operating with reduced energy requirements. In addition, there is a need for colorant compounds that exhibit desirably high chroma in phase change inks. Further, there is a need for colorant compounds that exhibit satisfactory hue in phase change inks. Additionally, there is a need for colorant compounds that exhibit a high degree of lightfastness in phase change inks. A need also remains for colorant compounds that exhibit a relatively low degree of diffusion and bleeding into adjoining printed areas of different colors when incorporated into phase change inks and printed. In addition, a need remains for colorant compounds that are safe to handle. Further, a need remains for colorant compounds that enable generation of prints with reduced pile height.

SUMMARY

Disclosed herein are colorant compounds of the formulae

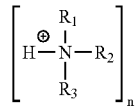

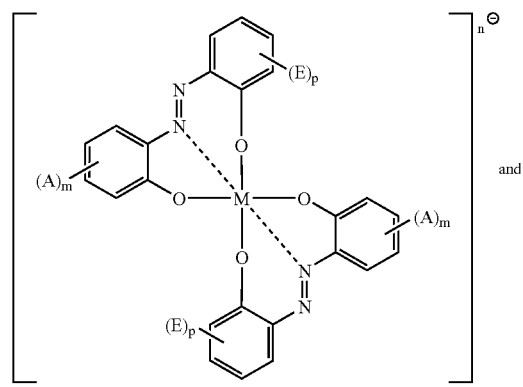

and

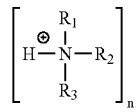

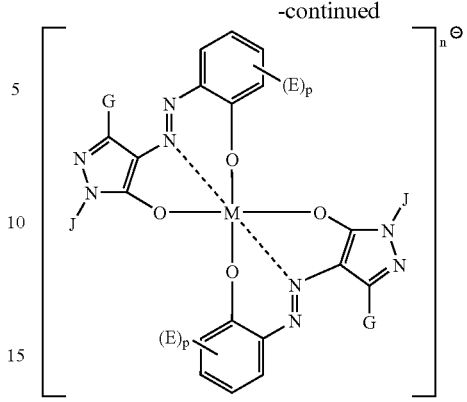

wherein $R_1$, $R_2$, and $R_3$ each, independently of the others, is a hydrogen atom, an alkyl group, including linear and branched, saturated and unsaturated, cyclic and acyclic, and substituted and unsubstituted alkyl groups, and wherein hetero atoms either may or may not be present in the alkyl group, an arylalkyl group, including substituted and unsubstituted arylalkyl groups, wherein the alkyl portion of the arylalkyl group can be linear or branched, saturated or unsaturated, cyclic or acyclic, and substituted or unsubstituted, and wherein hetero atoms either may or may not be present in either the aryl or the alkyl portion of the arylalkyl group, or an alkylaryl group, including substituted and unsubstituted alkylaryl groups, wherein the alkyl portion of the alkylaryl group can be linear or branched, saturated or unsaturated, cyclic or acyclic, and substituted or unsubstituted, and wherein hetero atoms either may or may not be present in either the aryl or the alkyl portion of the alkylaryl group, provided that the total number of carbon atoms and hetero atoms, excluding atoms in any substituents, in $R_1+R_2+R_3$ is at least about 18, M is a metal atom, each A, each E, and each G, independently of the other, represents a substituent on a phenyl or pyrazolone ring, wherein G can also be a hydrogen atom, m is an integer of 0, 1, or 2, p is an integer of 0, 1, 2, 3, or 4, J represents (i) a hydrogen atom, (ii) an alkyl group (including linear and branched, saturated and unsaturated, cyclic and acyclic, and substituted and unsubstituted alkyl groups, and wherein hetero atoms either may or may not be present in the alkyl group), (iii) an aryl group (including substituted and unsubstituted aryl groups, and wherein hetero atoms either may or may not be present in the aryl group), (iv) an arylalkyl group (including substituted and unsubstituted arylalkyl groups, wherein the alkyl portion of the arylalkyl group can be linear or branched, saturated or unsaturated, and cyclic or acyclic, and wherein hetero atoms either may or may not be present in either the aryl or the alkyl portion of the arylalkyl group), or (v) an alkylaryl group (including substituted and unsubstituted alkylaryl groups, wherein the alkyl portion of the alkylaryl group can be linear or branched, saturated or unsaturated, and cyclic or acyclic, and wherein hetero atoms either may or may not be present in either the aryl or the alkyl portion of the alkylaryl group), wherein two or more substituents on the phenyl or pyrazolone rings can be joined together to form a ring, and n represents an integer of 1, 2, or 3.

DETAILED DESCRIPTION

Disclosed herein are colorant compounds of the formulae

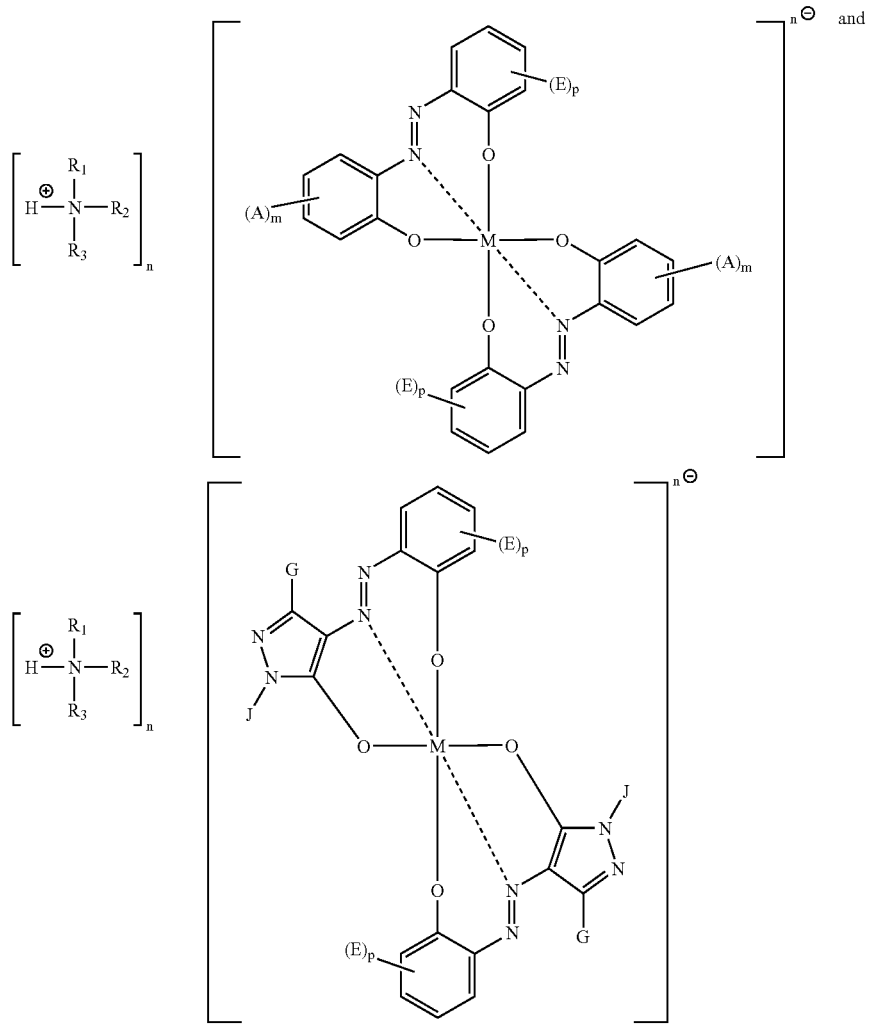

wherein each A, each E, and each G, independently of the other, represents a substituent on a phenyl or pyrazolone ring, such as (but not limited to) an alkyl group (including linear and branched, saturated and unsaturated, cyclic and acyclic, and substituted and unsubstituted alkyl groups, and wherein hetero atoms, such as oxygen, nitrogen, sulfur, silicon, phosphorus, boron, and the like either may or may not be present in the alkyl group), in one embodiment with at least 1 carbon atom, and in one embodiment with no more than about 50 carbon atoms, in another embodiment with no more than about 18 carbon atoms, and in yet another embodiment with no more than about 2 carbon atoms, although the number of carbon atoms can be outside of these ranges, an aryl group (including substituted and unsubstituted aryl groups, and wherein hetero atoms, such as oxygen, nitrogen, sulfur, silicon, phosphorus, boron, and the like either may or may not be present in the aryl group), in one embodiment with at least about 5 carbon atoms, and in another embodiment with at least about 6 carbon atoms, and in one embodiment with no more than about 20 carbon atoms, in another embodiment with no more than about 14 carbon atoms, and in yet another embodiment with no more than about 10 carbon atoms, although the number of carbon atoms can be outside of these ranges, such as phenyl, naphthyl, anthryl, or the like, an arylalkyl group (including substituted and unsubstituted arylalkyl groups, wherein the alkyl portion of the arylalkyl group can be linear or branched, saturated or unsaturated, and cyclic or acyclic, and wherein. hetero atoms, such as oxygen, nitrogen, sulfur, silicon, phosphorus, boron, and the like either may or may not be present in either the aryl or the alkyl portion of the arylalkyl group), in one embodiment with at least about 6 carbon atoms, and in another embodiment with at least about 7 carbon atoms, and in one embodiment with no more than about 30 carbon atoms, in another embodiment with no more than about 18 carbon atoms, and in yet another embodiment with no more than about 12 carbon atoms, although the number of carbon atoms can be outside of these ranges, such as benzyl or the like, an alkylaryl group (including substituted and unsubstituted alkylaryl groups, wherein the alkyl portion of the alkylaryl group can be linear or branched, saturated or unsaturated, and cyclic or acyclic, and wherein hetero atoms, such as oxygen, nitrogen, sulfur, silicon, phosphorus, boron, and the like either may or may not be present in either the aryl or the alkyl portion of the alkylaryl group), in one embodiment with at least about 6 carbon atoms, and in another embodiment with at least about 7 carbon atoms, and in one embodiment with no more than about 30 carbon atoms, in another embodiment with no more than about 18 carbon atoms, and in yet another embodiment with no more than about 12 carbon atoms, although the number of carbon atoms can be outside of these ranges, such as tolyl or the like, a hydroxy group, a halogen atom, an amine group (including primary, secondary, and tertiary amine groups), an imine group, an ammonium group, a cyano group, a pyridine group, a pyridinium group, an ether group, an aldehyde group, a ketone group, an ester group, an amide group, a carbonyl group, a thiocarbonyl group, a sulfate group, a sulfonate group, a sulfonic acid group, a sulfide group, a sulfoxide group, a phosphine group, a phosphonium group, a phosphate group, a nitrile group, a mercapto group, a nitro group, a nitroso group, a sulfone group, an acyl group, an azo group, a cyanato group, a carboxylate group, a carboxylic acid group, a urethane group, a urea group, and the like, wherein G can also be a hydrogen atom, m is an integer of 0, 1, or 2, p is an integer of 0, 1, 2, 3, or 4, and J represents (i) a hydrogen atom, (ii) an alkyl group (including linear and branched, saturated and unsaturated, cyclic and acyclic, and substituted and unsubstituted alkyl groups, and wherein hetero atoms, such as oxygen, nitrogen, sulfur, silicon, phosphorus, boron, and the like either may or may not be present in the alkyl group), in one embodiment with at least 1 carbon atom, and in one embodiment with no more than about 50 carbon atoms, in another embodiment with no more than about 18 carbon atoms, and in yet another embodiment with no more than about 2 carbon atoms, although the number of carbon atoms can be outside of these ranges, (iii) an aryl group (including substituted and unsubstituted aryl groups, and wherein hetero atoms, such as oxygen, nitrogen, sulfur, silicon, phosphorus, boron, and the like either may or may not be present in the aryl group), in one embodiment with at least about 5 carbon atoms, and in another embodiment with at least about 6 carbon atoms, and in one embodiment with no more than about 20 carbon atoms, in another embodiment with no more than about 14 carbon atoms, and in yet another embodiment with no more than about 10 carbon atoms, although the number of carbon atoms can be outside of these ranges, such as phenyl, naphthyl, anthryl, or the like, (iv) an arylalkyl group (including substituted and unsubstituted arylalkyl groups, wherein the alkyl portion of the arylalkyl group can be linear or branched, saturated or unsaturated, and cyclic or acyclic, and wherein hetero atoms, such as oxygen, nitrogen, sulfur, silicon, phosphorus, boron, and the like either may or may not be present in either the aryl or the alkyl portion of the arylalkyl group), in one embodiment with at least about 6 carbon atoms, and in another embodiment with at least about 7 carbon atoms, and in one embodiment with no more than about 30 carbon atoms, in another embodiment with no more than about 18 carbon atoms, and in yet another embodiment with no more than about 12 carbon atoms, although the number of carbon atoms can be outside of these ranges, such as benzyl or the like, or (v) an alkylaryl group (including substituted and unsubstituted alkylaryl groups, wherein the alkyl portion of the alkylaryl group can be linear or branched, saturated or unsaturated, and cyclic or acyclic, and wherein hetero atoms, such as oxygen, nitrogen, sulfur, silicon, phosphorus, boron, and the like either may or may not be present in either the aryl or the alkyl portion of the alkylaryl group), in one embodiment with at least about 6 carbon atoms, and in another embodiment with at least about 7 carbon atoms, and in one embodiment with no more than about 30 carbon atoms, in another embodiment with no more than about 18 carbon atoms, and in yet another embodiment with no more than about 12 carbon atoms, although the number of carbon atoms can be outside of these ranges, such as tolyl or the like, wherein the substituents on the substituted alkyl, aryl, arylalkyl, and alkylaryl groups can be (but are not limited to) hydroxy groups, halogen atoms, amine groups (including primary, secondary, and tertiary amine groups), imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, azo groups, cyanato groups, carboxylate groups, carboxylic acid groups, urethane groups, urea groups, and the like, wherein two or more substituents on the phenyl or pyrazolone rings can be joined together to form a ring. These colorants include chromogenic compounds derived from compounds of the formulae

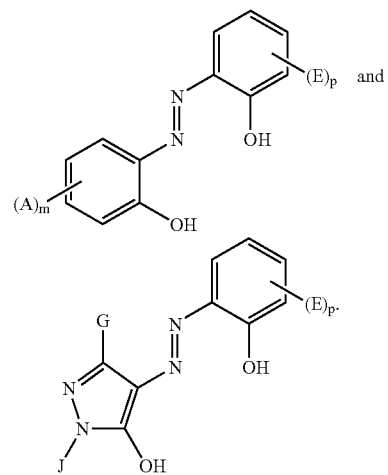

The integer "n" represents both the charge on the chromogen compound complex and the number of countercations present. This integer is at least 1, and can also be 2 or 3.

These compounds form complexes with metal compounds to form chromogenic compounds. Suitable metals M include any metals that form complexes with the above-indicated compounds wherein the complex will have a negative charge of at least −1. Examples of suitable metals include (but are not limited to) chromium, iron, cobalt, molybdenum, tungsten, ruthenium, osmium, rhodium, iridium, manganese, rhenium, vanadium, niobium, tantalum, titanium, zirconium, hafnium, scandium, yttrium, lanthanum, zinc, aluminum, metals in the Lanthanide Series, and the like, as well as mixtures thereof.

While not being limited to any particular theory, it is believed that the complexes formed are as follows:

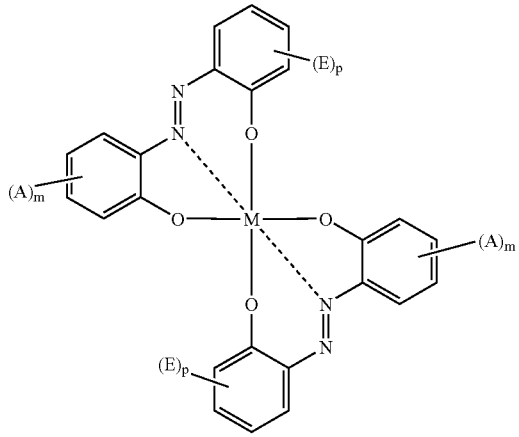

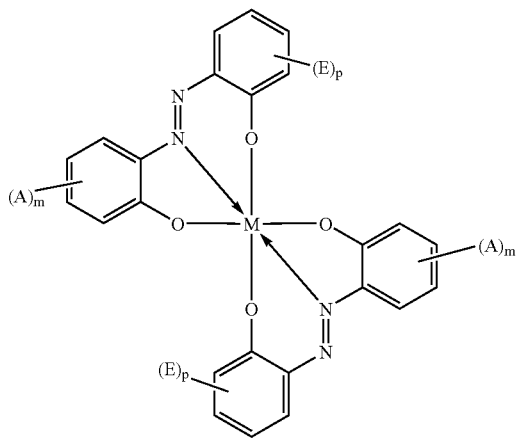

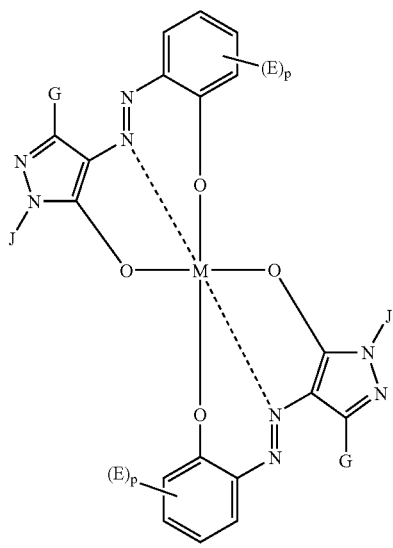

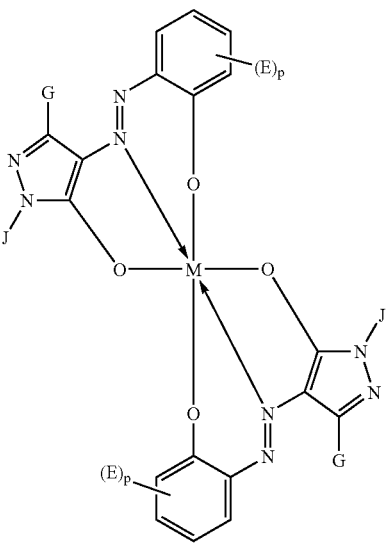

wherein the dotted lines and arrows represent coordination bonds between the lone pair electrons on the nitrogen atoms and the metal atom. Since the oxygen atoms each impart a negative charge to the resulting complex, the resulting charge of the compound depends upon the valence state of the metal.

Some specific examples of suitable chromogenic compound complexes for the compounds disclosed herein include (but are not limited to) the following:

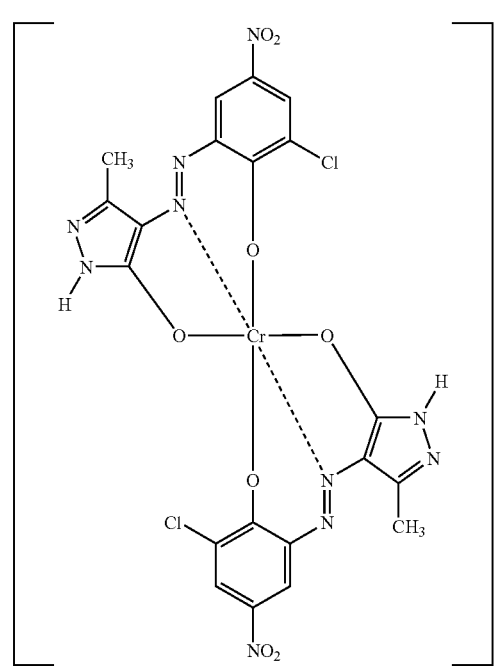

-continued
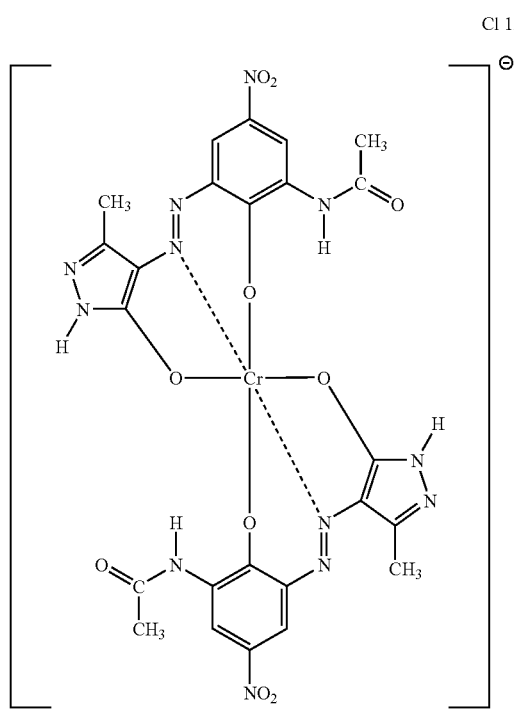
Cl 12696
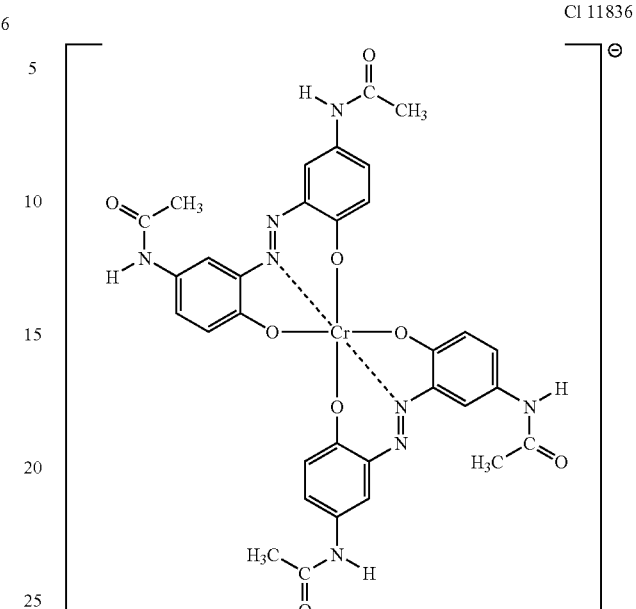
Cl 11836
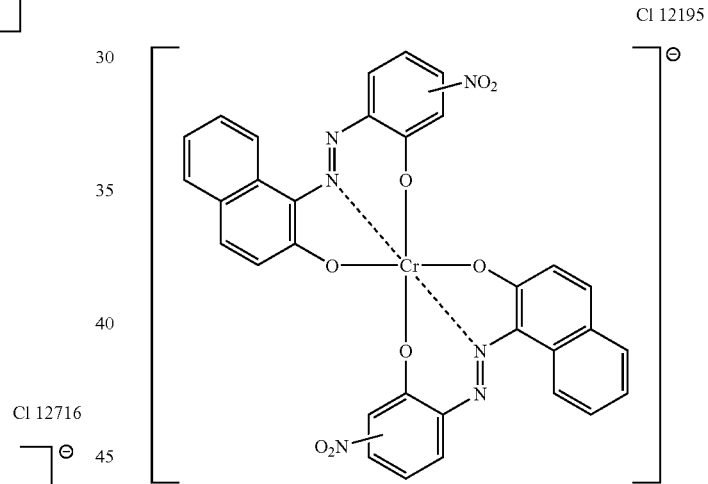
Cl 12195
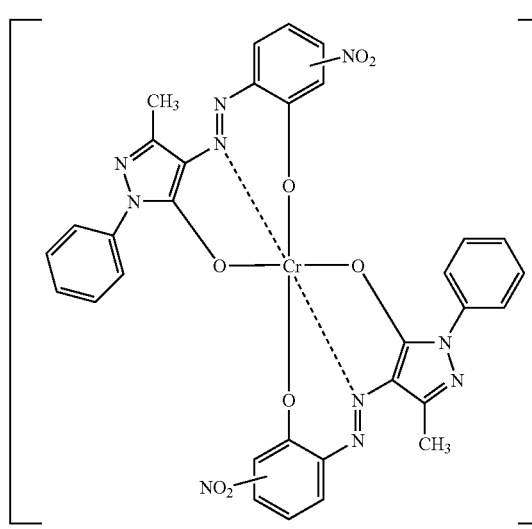
Cl 12716
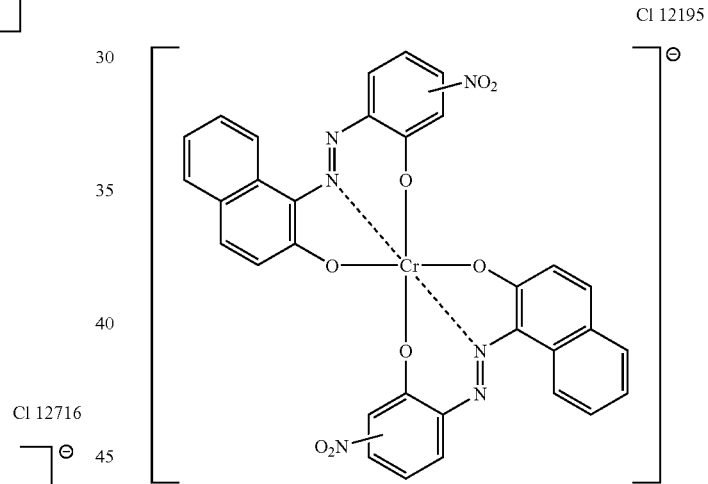
Cl 12196

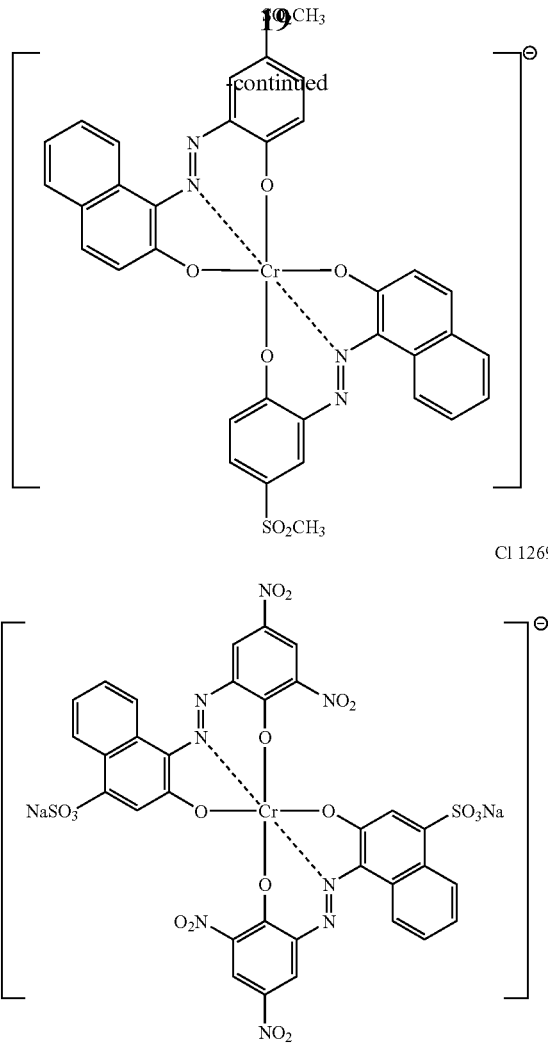

Cl 12695 and the like, as well as mixtures thereof.

The chromogenic compound complexes have a negative charge of at least −1, and accordingly are associated with a counterion. The counterion is of the formula

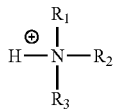

wherein $R_1$, $R_2$, and $R_3$ each, independently of the others, can be (i) a hydrogen atom, (ii) an alkyl group (including linear and branched, saturated and unsaturated, cyclic and acyclic, and substituted and unsubstituted alkyl groups, and wherein hetero atoms, such as oxygen, nitrogen, sulfur, silicon, phosphorus, boron, and the like either may or may not be present in the alkyl group), in one embodiment with at least 1 carbon atom, and in one embodiment with no more than about 150 carbon atoms, in another embodiment with no more than about 54 carbon atoms, and in yet another embodiment with no more than about 48 carbon atoms, although the number of carbon atoms can be outside of these ranges, (iii) an arylalkyl group (including substituted and unsubstituted arylalkyl groups, wherein the alkyl portion of the arylalkyl group can be linear or branched, saturated or unsaturated, cyclic or acyclic, and substituted or unsubstituted, and wherein hetero atoms, such as oxygen, nitrogen, sulfur, silicon, phosphorus, boron, and the like either may or may not be present in either the aryl or the alkyl portion of the arylalkyl group), in one embodiment with at least about 6 carbon atoms, and in another embodiment with at least about 7 carbon atoms, and in one embodiment with no more than about 56 carbon atoms, in another embodiment with no more than about 24 carbon atoms, and in yet another embodiment with no more than about 18 carbon atoms, although the number of carbon atoms can be outside of these ranges, such as benzyl or the like, or (iv) an alkylaryl group (including substituted and unsubstituted alkylaryl groups, wherein the alkyl portion of the alkylaryl group can be linear or branched, saturated or unsaturated, cyclic or acyclic, and substituted or unsubstituted, and wherein hetero atoms, such as oxygen, nitrogen, sulfur, silicon, phosphorus, boron, and the like either may or may not be present in either the aryl or the alkyl portion of the alkylaryl group), in one embodiment with at least about 6 carbon atoms, and in another embodiment with at least about 7 carbon atoms, and in one embodiment with no more than about 56 carbon atoms, in another embodiment with no more than about 24 carbon atoms, and in yet another embodiment with no more than about 18 carbon atoms, although the number of carbon atoms can be outside of these ranges, such as tolyl or the like, provided that the total number of carbon atoms and hetero atoms (excluding atoms in any substituents) in $R_1+R_2+R_3$ is in one embodiment at least about 18, in another embodiment at least about 19, in yet another embodiment at least about 20, in another embodiment at least about 21, in yet another embodiment at least about 22, in still another embodiment at least about 23, and in another embodiment at least about 24, wherein the total number of carbon atoms and hetero atoms (excluding atoms in any substituents) in $R_1+R_2+R_3$ is one embodiment no more than about 150, in another embodiment no more than about 54, and in another embodiment no more than about 48, although the total number of carbon atoms can be outside of this range, wherein the substituents on the substituted alkyl, arylalkyl, and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, azo groups, cyanato groups, carboxylate groups, carboxylic acid groups, urethane groups, urea groups, mixtures thereof, and the like, wherein two or more substituents can be joined together to form a ring. In one embodiment, $R_1$, $R_2$, and $R_3$ are the same as each other. In another embodiment, at least two of $R_1$, $R_2$, and $R_3$ are different from each other. In yet another embodiment, all three of $R_1$, $R_2$, and $R_3$ are different from each other.

The colorant compounds disclosed herein can be prepared by any desired or effective method. For example, a chromogenic compound having a different counterion or in the free acid form can be obtained commercially and the counterion can be replaced with the desired counterion. Metallizing azo dyes can be done by any desired or effective method, such as that described in, for example, "British Intelligence Objectives Subcommittee Report 961," Publications Board No. 86139, Library of Congress, Washington, D.C. 1947, pp. 71-72, 110, 149-151, 160, 163, 164, the disclosure of which is totally incorporated herein by reference. The desired counterions can generally be derived from commercially available amine compounds as well. Primary, secondary, and tertiary amines can also be prepared as described in, for example, *Comprehensive Organic Transformations—A Guide to Functional Group Preparations,* $2^{nd}$ Ed., Richard C. Larock, Wiley-VCH, 1999 ISBN 0-471-19031-4 New York, N.Y., the disclosure of which is totally incorporated herein by reference.

For example, in one embodiment, the chromogenic compound and the amine compound from which the counterion is to be derived can be heated together until the ion exchange is complete, followed by distilling off the solvent (if a solvent is used) and recovery of the colorant compound thus prepared.

Any desired or effective relative amounts of the chromogenic compound and the amine compound from which the counterion is to be derived can be employed. When the charge on the chromogenic compound is −1, the relative amounts can be, for example, in one embodiment at least about 0.1 mole of chromogenic compound per every one mole of amine compound, in another embodiment at least about 0.5 mole of chromogenic compound per every one mole of amine compound, and in yet another embodiment at least about 0.9 mole of chromogenic compound per every one mole of amine compound, and in one embodiment no more than about 3 moles of chromogenic compound per every one mole of amine compound, in another embodiment no more than about 2 moles of chromogenic compound per every one mole of amine compound, and in yet another embodiment no more than about 1.1 moles of chromogenic compound per every one mole of amine compound, although the relative amounts can be outside of these ranges. When the charge on the chromogenic compound is −2, the amount of amine compound will, of course be doubled, and when the charge on the chromogenic compound is higher, the amount of amine compound will, of course, be adjusted accordingly.

When a solvent is used, any desired or effective solvent can be employed. Examples of suitable solvents include methyl isobutyl ketone, methyl ethyl ketone, acetone, methanol, ethanol, n-propanol, isopropanol, butanol, and the like, as well as mixtures thereof.

The reactants are present in the solvent in any desired or effective amount, in one embodiment at least about 1 gram of reactants per liter of solvent, in another embodiment at least about 225 grams of reactants per liter of solvent, and in yet another embodiment at least about 450 grams of reactants per liter of solvent, and in one embodiment no more than about 2,000 grams of reactants per liter of solvent, in another embodiment no more than about 1,000 grams of reactants per liter of solvent, and in yet another embodiment no more than about 500 grams of reactants per liter of solvent, although the relative amounts of reactants and solvent can be outside of these ranges.

The reactants can be heated to any desired or effective temperature, in one embodiment at least about 25° C., in another embodiment at least about 65° C., and in yet another embodiment at least about 110° C., and in one embodiment no more than about 150° C., in another embodiment no more than about 125° C., and in yet another embodiment no more than about 110° C., although the temperature can be outside of these ranges.

The reactants can be heated for any desired or effective period of time, in one embodiment at least about 1 hour, in another embodiment at least about 12 hours, and in yet another embodiment at least about 16 hours, and in one embodiment no more than about 7 days, in another embodiment no more than about 1 day, and in yet another embodiment no more than about 18 hours, although the period of time can be outside of these ranges.

Thereafter, the colorant compound thus prepared can be recovered by any desired or effective method, such as by distillation, vacuum, quenching into a solvent in which the product is not soluble (such as water), or the like.

Specific embodiments will now be described in detail. These examples are intended to be illustrative, and the claims are not limited to the materials, conditions, or process parameters set forth in these embodiments. All parts and percentages are by weight unless otherwise indicated.

EXAMPLE I

To a 2-liter 3-necked round bottom flask equipped with TEFLON® coated magnet, silicone oil bath, magnetically stirred hot plate, and condenser was charged 1,100 g methyl isobutyl ketone (obtained from Aldrich Chemical Co., Milwaukee, Wis.). Stirring was initiated and Solvent Black 45 free acid dye (about 250 g, 0.275 moles, obtained from Orient Chemical Industries Ltd, Osaka, Japan), of the formula

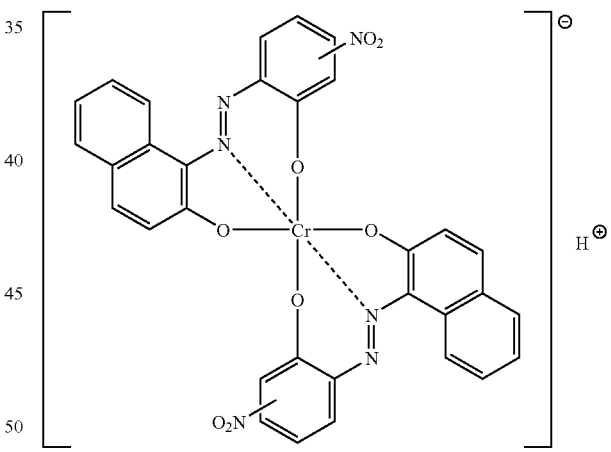

was added to the flask. The oil bath was heated to 120° C. for about 2 hours until the dye was completely dissolved. About 196.3 g (0.20 moles) of distearyl amine (ARMEEN® 2HT, obtained from Akzo Nobel, McCook, Ill.) was subsequently added, and the reaction mixture was then refluxed for about 16 hours. A distillation setup was subsequently attached and the solvent was distilled off with the aid of a nitrogen inlet. When the distillation appeared complete, vacuum was applied to the system. The vacuum was gradually increased to prevent foaming and was held for about 16 hours at 120° C. The flask was then transferred to an oven at 120° C. and secured upside down, and the product was collected. The product was believed to be of the formula

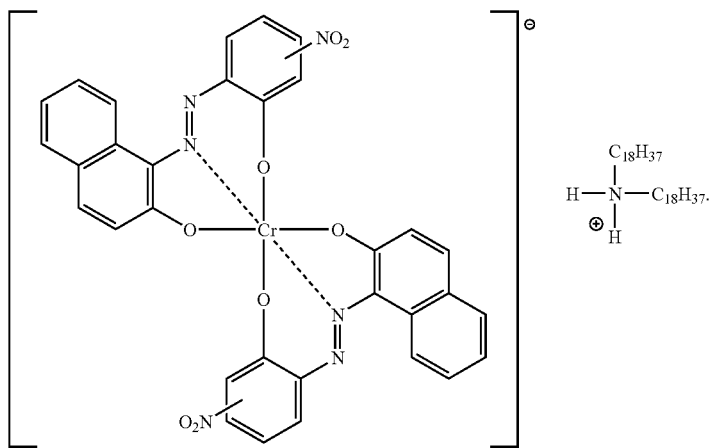

EXAMPLE II

To a 100-milliliter 3-necked round bottom flask equipped with TEFLON® coated magnet, silicone oil bath, magnetically stirred hot plate, and condenser was charged 75 g methyl isobutyl ketone (obtained from Aldrich Chemical Co., Milwaukee, Wis.). Stirring was initiated and Solvent Black 45 free acid dye (about 10 g, 0.015 moles, obtained from Orient Chemical Industries Ltd, Osaka, Japan) was added to the flask. The oil bath was heated to 120° C. for about 0.5 hours until the dye was completely dissolved. About 6.2 g (0.015 moles) of PA28 (obtained from Tomah Products Inc., Milton, Wis.) was subsequently added, and the reaction mixture was then refluxed for about 16 hours. A distillation setup was thereafter attached and the solvent was distilled off with the aid of a nitrogen inlet. When the distillation appeared complete, the flask was then transferred to an oven at 120° C. and secured upside down for about 1 hour, and the product was collected. The product was believed to be of the formula

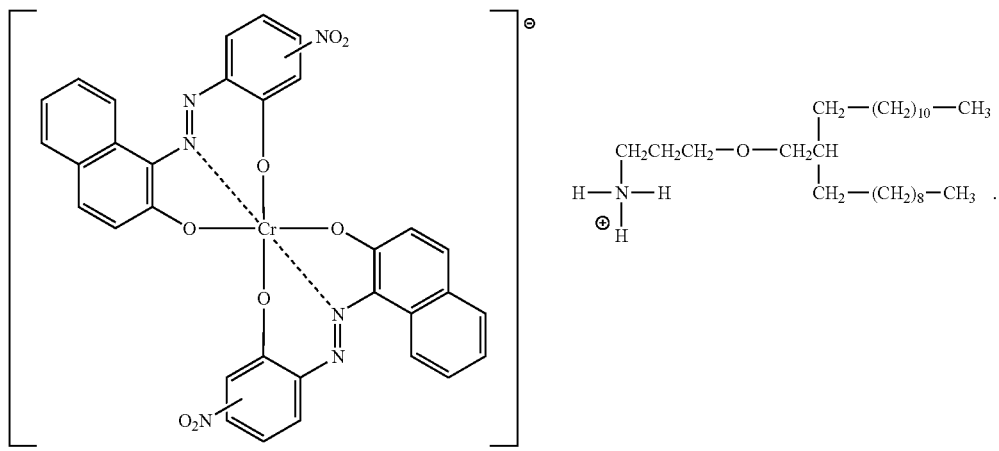

EXAMPLE III

The process of Example II was repeated except that about 5.11 g (0.015 moles) of SA19.3 (obtained from Tomah Products Inc., Milton, Wis.) was substituted for the 6.2 g (0.015 moles) of PA28. The product was believed to be of the formula

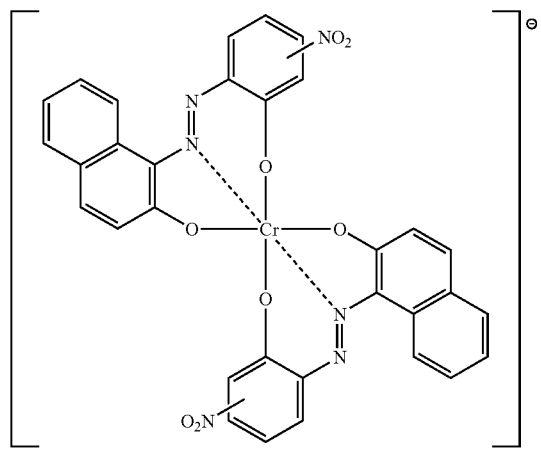
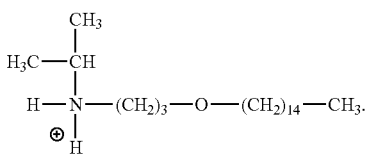

EXAMPLE IV

To a 100-milliliter 3-necked round bottom flask equipped with TEFLON® coated magnet, silicone oil bath, magnetically stirred hot plate, and condenser was charged 35 g methyl isobutyl ketone (obtained from Aldrich Chemical Co., Milwaukee, Wis.). Stirring was initiated and Solvent Black 45 free acid dye (about 5 g, 0.0075 moles, obtained from Orient Chemical Industries Ltd, Osaka, Japan) was added to the flask. The oil bath was heated to 120° C. for about 0.5 hours until the dye was completely dissolved. About 2.9 g (0.0075 moles) of PROPOMEEN O/12 (obtained from Akzo Nobel, McCook, Ill.) was subsequently added, and the reaction mixture was then refluxed for about 16 hours. A distillation setup was thereafter attached and the solvent was distilled off with the aid of a nitrogen inlet. When the distillation appeared complete, the flask was then transferred to an oven at 120° C. and secured upside down for about 1 hour, and the product was collected. The product was believed to be of the formula

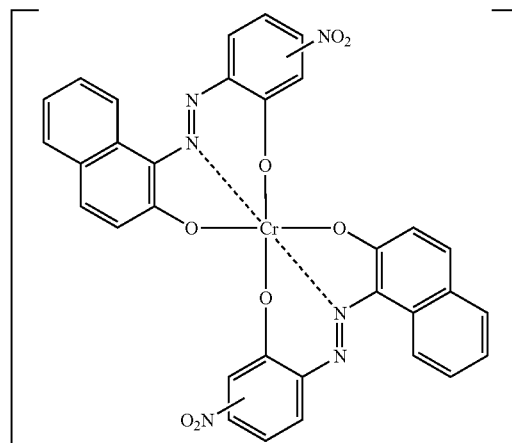
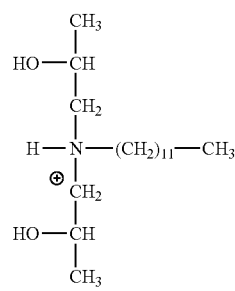

EXAMPLE V

The process of Example II was repeated except that about 10.3 g (0.015 moles) of trihexadecylamine (ARMEEN® 316 obtained from Akzo Nobel, McCook, Ill.) was substituted for the 6.2 g (0.015 moles) of PA28. The product was believed to be of the formula

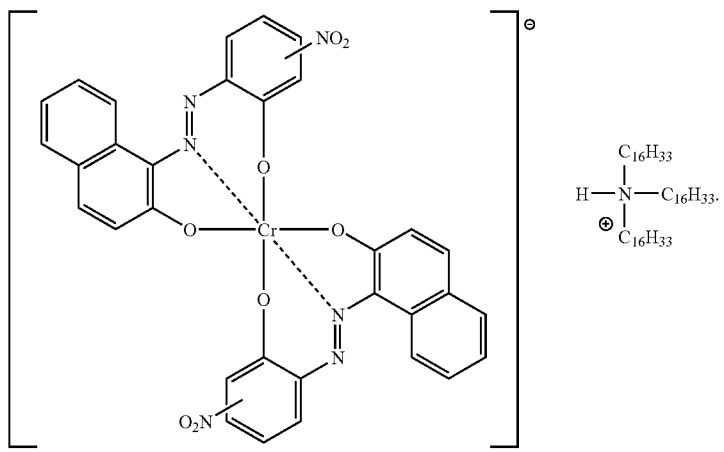 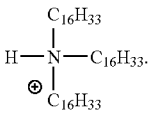

EXAMPLE VI

The process of Example II was repeated except that about 7.8 g (0.015 moles) of tridodecylamine (ARMEEN® 312 obtained from Akzo Nobel, McCook, Ill.) was substituted for the 6.2 g (0.015 moles) of PA28. The product was believed to be of the formula

EXAMPLE VII

The processes of Examples I through VI are repeated using CI 12695 as the free acid dye instead of Solvent Black 45 (CI 12195). It is believed that similar results will be obtained.

EXAMPLE VIII

The processes of Examples I through VI are repeated using CI 12696 as the free acid dye instead of Solvent Black 45 (CI 12195). It is believed that similar results will be obtained.

EXAMPLE IX

The processes of Examples I through VI are repeated using CI 12716 as the free acid dye instead of Solvent Black 45 (CI 12195). It is believed that similar results will be obtained.

EXAMPLE X

The processes of Examples I through VI are repeated using CI 11836 as the free acid dye instead of Solvent Black 45 (CI 12195). It is believed that similar results will be obtained.

EXAMPLE XI

The processes of Examples I through VI are repeated using CI 12196 as the free acid dye instead of Solvent Black 45 (CI 12195). It is believed that similar results will be obtained.

EXAMPLE XII

The processes of Examples I through VI are repeated using CI 12205 as the free acid dye instead of Solvent Black 45 (CI 12195). It is believed that similar results will be obtained.

INK EXAMPLES

Ink compositions were prepared by the following process. All ink ingredients except colorant(s) were charged into a stainless steel beaker. The resulting mixture was then melted together in an oven, followed by blending by stirring in a temperature controlled mantle at the same temperature as the oven for about 0.3 hour, at a temperature of about 110° C. for Inks A and B and Comparative Ink 1 and at a temperature of about 135 for Ink C. To this mixture was then added the colorant(s). After stirring for about 2 additional hours, the ink thus formed was filtered through a heated MOTTO apparatus (obtained from Mott Metallurgical) using Whatman #3 filter paper under a pressure of about 15 pounds per square inch. The filtered phase change ink thus formed was poured into molds and allowed to solidify to form ink sticks. Inks were prepared from the following ingredients: polyethylene wax (PE 500, obtained from Baker Petrolite, Tulsa, Okla.); polyethylene wax (PE 655, obtained from Baker Petrolite, Tulsa, Okla.); a branched triamide of the formula

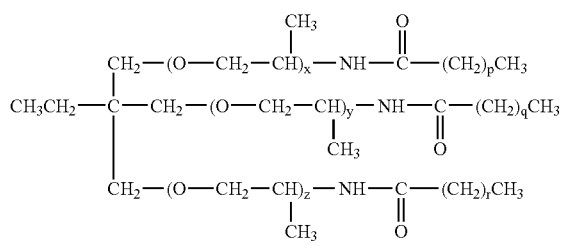

wherein p, q, and r each have an average value of about 35, prepared as described in Example II of U.S. Pat. No. 6,860,930, the disclosure of which is totally incorporated herein by reference; a tetra-amide (obtained from the reaction of one equivalent of a C-36 dimer acid obtained from Uniqema, New Castle, Del. with two equivalents of ethylene diamine and UNICID® 700 (obtained from Baker Petrolite, Tulsa, Okla., a long chain hydrocarbon having a terminal carboxylic acid group), prepared as described in Example 1 of U.S. Pat. No. 6,174,937, the disclosure of which is totally incorporated herein by reference); stearyl stearamide wax (KEMAMIDE® S-180, obtained from Crompton Corporation, Greenwich, Conn.); KE-100 Resin (triglycerides of hydrogenated abietic (rosin) acid, commercially available from Arakawa Chemical Industries, Ltd.); a urethane resin obtained from the reaction of two equivalents of ABITOL® E hydroabietyl alcohol (obtained from Hercules Inc., Wilmington, Del.) and one equivalent of isophorone diisocyanate, prepared as described in Example 1 of U.S. Pat. No. 5,782,966, the disclosure of which is totally incorporated herein by reference (hereinafter referred to as urethane resin #1); a urethane resin that was the adduct of three equivalents of stearyl isocyanate and a glycerol-based alcohol, prepared as described in Example 4 of U.S. Pat. No. 6,309,453, the disclosure of which is totally incorporated herein by reference (hereinafter referred to as urethane resin #2); NAUGUARD® 445 antioxidant (obtained from Uniroyal Chemical Co., Middlebury, Conn.); Disperse Orange 47 dye (DO-47, obtained from Keystone Aniline Corporation, Chicago, Ill.), and the colorant prepared as described in Example I. The amounts of each ingredient are listed in the table below for each ink:

| | Ink | | | |
|---|---|---|---|---|
| | A | B | C | 1 |
| polyethylene wax 500 | 55.45 | 52.28 | 0 | 56.50 |
| polyethylene wax 655 | 0 | 0 | 35.95 | 0 |
| branched triamide | 10.99 | 12.29 | 0 | 11.2 |
| tetra-amide | 0 | 0 | 13.41 | 0 |
| stearyl stearamide wax | 13.53 | 15.03 | 23.99 | 13.60 |
| KE-100 Resin | 9.70 | 10.86 | 0 | 10.20 |
| urethane resin # 1 | 0 | 0 | 12.26 | 0 |
| urethane resin # 2 | 3.96 | 4.37 | 8.02 | 4.0 |
| antioxidant | 0.18 | 0.17 | 0.20 | 0.20 |
| DO-47 | 0.20 | 0.20 | 0.20 | 0.20 |
| Example I colorant | 5.99 | 4.80 | 5.99 | 0 |
| Solvent Black 45 | 0 | 0 | 0 | 4.10 |

To evaluate the dye solubility in the ink base, spectral strengths at 580 nm of the inks were used as the measurement of dye solubility in the filtered and unfiltered inks. Any undissolved dye in the ink was filtered out, resulting in the smaller spectral strength of the filtered ink compared to that of the unfiltered ink. Accordingly, the ratio of the filtered ink's spectral strength to the unfiltered ink's spectral strength ("SS ratio") is a measure of dye solubility; to the degree that the SS ratio is significantly less than 1, it indicates poor solubility of the dye in the ink base. Glass transition temperature ($T_g$) was measured by Dynamic Mechanic Analysis using a Rheometrics Solid Analyzer (RSA II). Melting point and freezing point were measured by Differential Scanning Calorimetry (DSC) using a DUPONT 2100 calorimeter.

| | Ink | | | |
|---|---|---|---|---|
| | A | B | C | 1 |
| unfiltered spectral strength at 380 nm | 1014 | 812 | 1030 | 884 |
| unfiltered spectral strength at 480 nm | 973 | 827 | 959 | 808 |
| unfiltered spectral strength at 580 nm | 1142 | 886 | 1115 | 928 |
| filtered spectral strength at 380 nm | 993 | 796 | 1028 | 543 |
| filtered spectral strength at 480 nm | 841 | 724 | 957 | 490 |
| filtered spectral strength at 580 nm | 1129 | 883 | 1111 | 545 |
| SS ratio (filtered/unfiltered at 580 nm) | 0.99 | 1.00 | 1.00 | 0.69 |
| viscosity at 110° C. (centipoise) (filtered) | 10.45 | 10.83 | — | 9.59 |
| viscosity at 140° C. (centipoise) (filtered) | — | — | 10.86 | — |
| $T_g$ | 9.63 | 11.8 | — | — |
| melting point (° C.) | 80.2 | 80.2 | — | — |
| freezing point (° C.) | 67.2, 72.4 | 68.7, 74.5 | — | — |

Inks A and B were incorporated into a XEROX® PHASER® 8400 modified to print at 110° C. and printed successfully. Ink C was incorporated into a XEROX® PHASER® 8400 printing at the standard printing temperature and was printed successfully. As the data indicate, the colorant prepared in Example I dissolved well in the inks. In contrast, the commercial colorant dissolved poorly, as indicated by the spectral strength ratio of filtered to unfiltered ink at 580 nanometers of 0.69.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A colorant compound of the formula

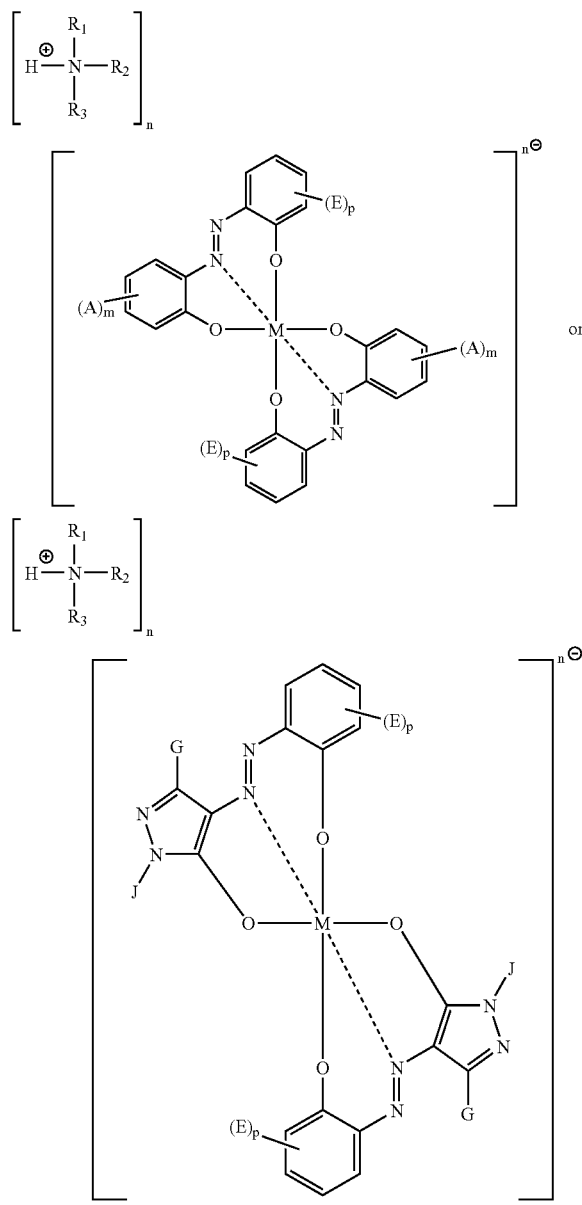

wherein $R_1$, $R_2$, and $R_3$ each, independently of the others, is a hydrogen atom, an alkyl group, including linear and branched, saturated and unsaturated, cyclic and acyclic, and substituted and unsubstituted alkyl groups, and wherein hetero atoms either may or may not be present in the alkyl group, an arylalkyl group, including substituted and unsubstituted arylalkyl groups, wherein the alkyl portion of the arylalkyl group can be linear or branched, saturated or unsaturated, cyclic or acyclic, and substituted or unsubstituted, and wherein hetero atoms either may or may not be present in either the aryl or the alkyl portion of the arylalkyl group, or an alkylaryl group, including substituted and unsubstituted alkylaryl groups, wherein the alkyl portion of the alkylaryl group can be linear or branched, saturated or unsaturated, cyclic or acyclic, and substituted or unsubstituted, and wherein hetero atoms either may or may not be present in either the aryl or the alkyl portion of the alkylaryl group, provided that the total number of carbon atoms and heteroatoms, excluding atoms in any substituents, in $R_1+R_2+R_3$ is at least about 18, M is a metal atom, each A, each E, and each G, independently of the other, represents a substituent on a phenyl or pyrazolone ring, wherein G can also be a hydrogen atom, m is an integer of 0, 1, or 2, p is an integer of 0, 1, 2, 3, or 4, J represents (i) a hydrogen atom, (ii) an alkyl group (including linear and branched, saturated and unsaturated, cyclic and acyclic, and substituted and unsubstituted alkyl groups, and wherein hetero atoms either may or may not be present in the alkyl group), (iii) an aryl group (including substituted and unsubstituted aryl groups, and wherein hetero atoms either may or may not be present in the aryl group), (iv) an arylalkyl group (including substituted and unsubstituted arylalkyl groups, wherein the alkyl portion of the arylalkyl group can be linear or branched, saturated or unsaturated, and cyclic or acyclic, and wherein hetero atoms either may or may not be present in either the aryl or the alkyl portion of the arylalkyl group), or (v) an alkylaryl group (including substituted and unsubstituted alkylaryl groups, wherein the alkyl portion of the alkylaryl group can be linear or branched, saturated or unsaturated, and cyclic or acyclic, and wherein hetero atoms either may or may not be present in either the aryl or the alkyl portion of the alkylaryl group), wherein two or more substituents on the phenyl or pyrazolone rings can be joined together to form a ring, and n represents an integer of 1, 2, or 3.

2. A colorant compound according to claim 1 of the formula

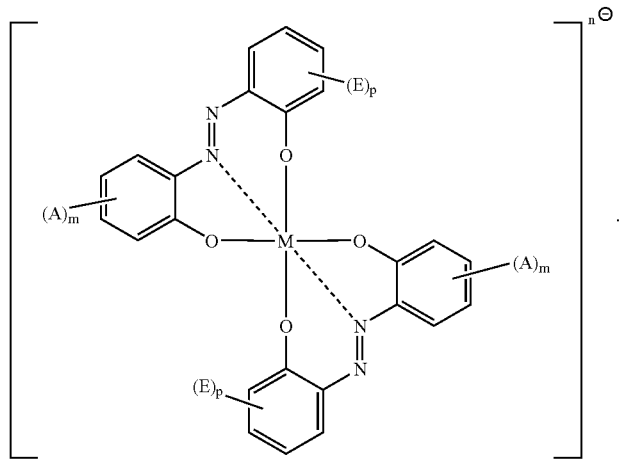

3. A colorant compound according to claim 1 of the formula

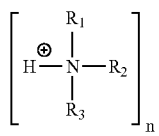

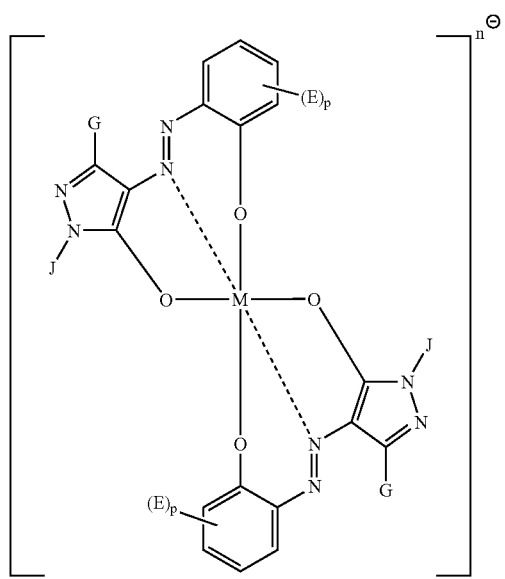

4. A colorant compound according to claim 1 wherein at least one of A, E, G, and J is an alkyl group, provided that when A is the at least one alkyl group, m is at least 1, and provided that when E is the at least one alkyl group, p is at least 1.

5. A colorant compound according to claim 4 wherein the alkyl group is a substituted alkyl group.

6. A colorant compound according to claim 4 wherein the alkyl group is an unsubstituted alkyl group.

7. A colorant compound according to claim 4 wherein the alkyl group contains at least one heteroatom therein.

8. A colorant compound according to claim 4 wherein the alkyl group contains no heteroatoms therein.

9. A colorant compound according to claim 1 wherein at least one of A, E, G, and J is an aryl group, provided that when A is the at least one aryl group, m is at least 1, and provided that when E is the at least one aryl group, p is at least 1.

10. A colorant compound according to claim 9 wherein the aryl group is a substituted aryl group.

11. A colorant compound according to claim 9 wherein the aryl group is an unsubstituted aryl group.

12. A colorant compound according to claim 9 wherein the aryl group contains at least one heteroatom therein.

13. A colorant compound according to claim 9 wherein the aryl group contains no heteroatoms therein.

14. A colorant compound according to claim 1 wherein at least one of A, E, G, and J is an arylalkyl or alkylaryl group, provided that when A is the at least one arylalkyl or alkylaryl group, m is at least 1, and provided that when E is the at least one arylalkyl or alkylaryl group, p is at least 1.

15. A colorant compound according to claim 14 wherein the arylalkyl or alkylaryl group is a substituted arylalkyl or alkylaryl group.

16. A colorant compound according to claim 14 wherein the arylalkyl or alkylaryl group is an unsubstituted arylalkyl or alkylaryl group.

17. A colorant compound according to claim 14 wherein the arylalkyl or alkylaryl group contains at least one heteroatom therein.

18. A colorant compound according to claim 14 wherein the arylalkyl or alkylaryl group contains no heteroatoms therein.

19. A colorant compound according to claim 1 wherein at least one of A, E, and G is a substituent selected from the group consisting of a hydroxy group, a halogen atom, an amine group, an imine group, an ammonium group, a cyano group, a pyridine group, a pyridinium group, an ether group, an aldehyde group, a ketone group, an ester group, an amide group, a carbonyl group, a thiocarbonyl group, a sulfate group, a sulfonate group, a sulfonic acid group, a sulfide group, a sulfoxide group, a phosphine group, a phosphonium group, a phosphate group, a nitrile group, a mercapto group, a nitro group, a nitroso group, a sulfone group, an acyl group, an azo group, a cyanato group, a carboxylate group, a carboxylic acid group, a urethane group, a urea group, or mixtures thereof, provided that when A is the at least one substituent, m is at least 1, and provided that when E is the at least one substituent, p is at least 1.

20. A colorant compound according to claim 1 wherein n is 1.

21. A colorant compound according to claim 1 wherein n is 2.

22. A colorant compound according to claim 1 wherein n is 3.

23. A colorant compound according to claim 1 wherein M is a metal in the Lanthanide Series.

24. A colorant compound according to claim 1 wherein M is chromium, iron, cobalt, molybdenum, tungsten, ruthenium, osmium, rhodium, iridium, manganese, rhenium, vanadium, niobium, tantalum, titanium, zirconium, hafnium, scandium, yttrium, lanthanum, zinc, or aluminum.

25. A colorant compound according to claim 1 wherein M is chromium, iron, cobalt.

26. A colorant compound according to claim 1 wherein M is chromium.

27. A colorant compound according to claim 1 of the formula

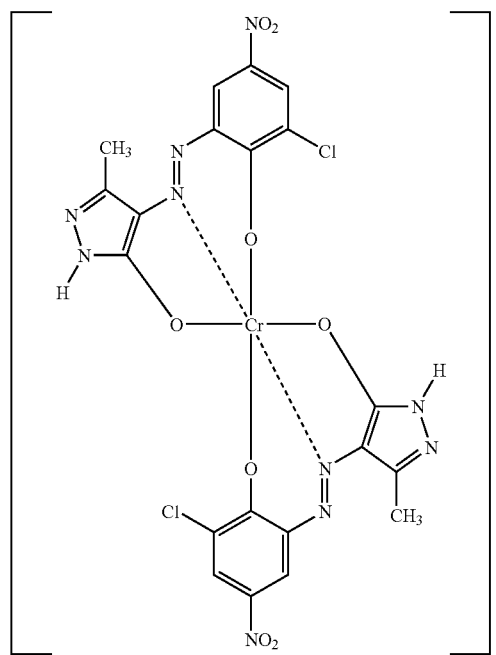
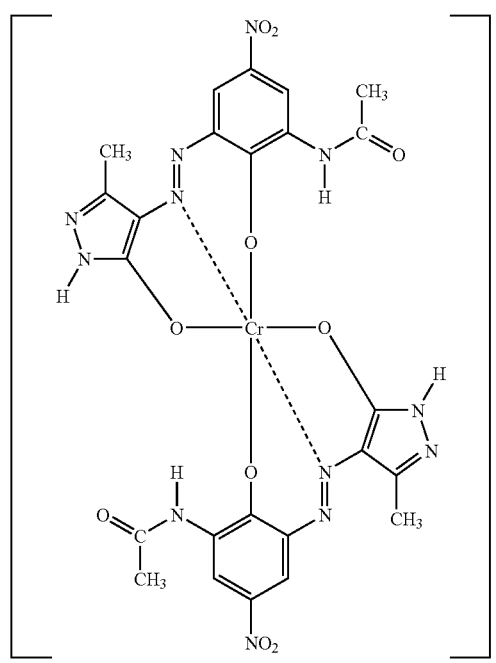
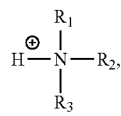

-continued
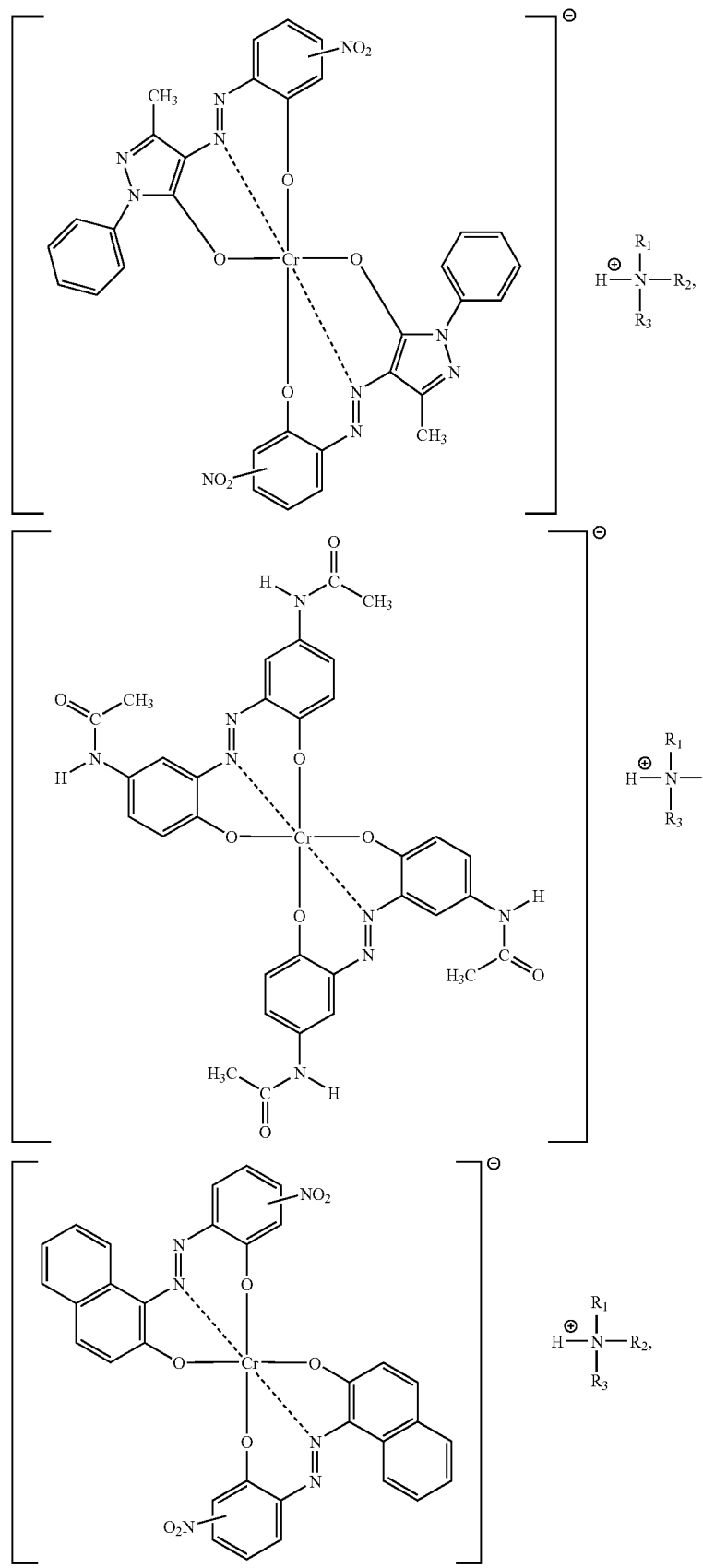

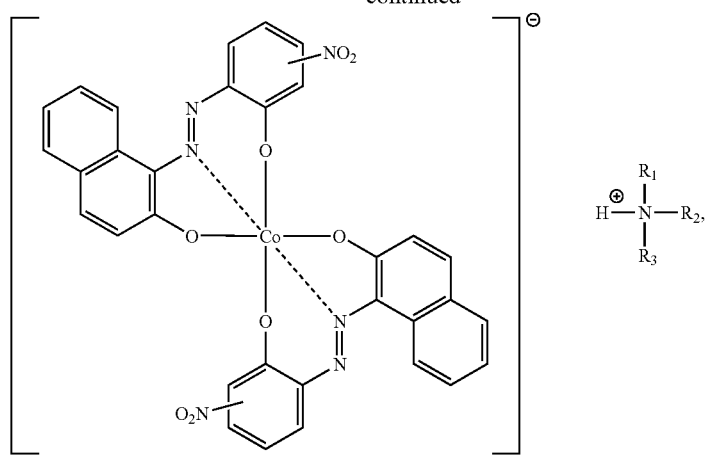 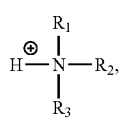
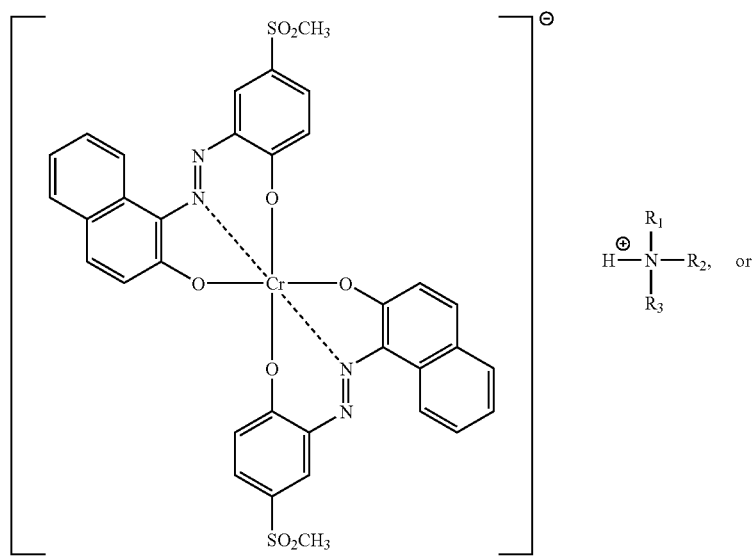 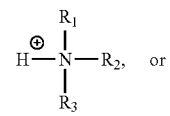
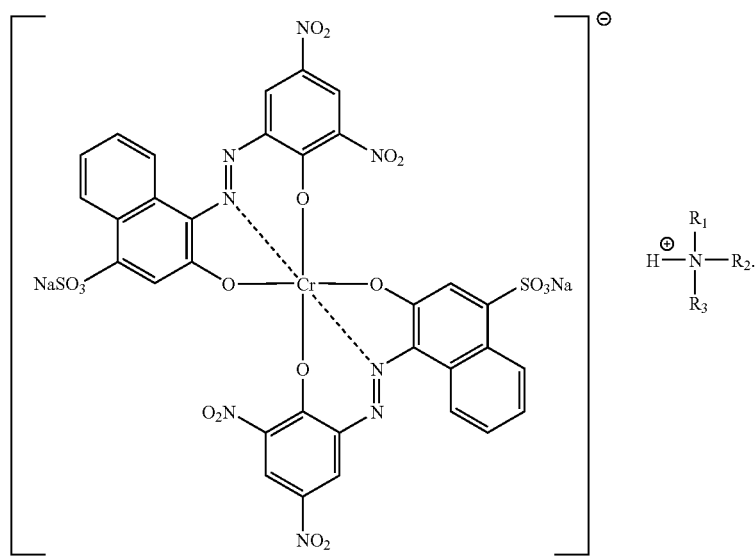 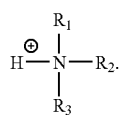

28. A colorant compound according to claim 1 of the formula

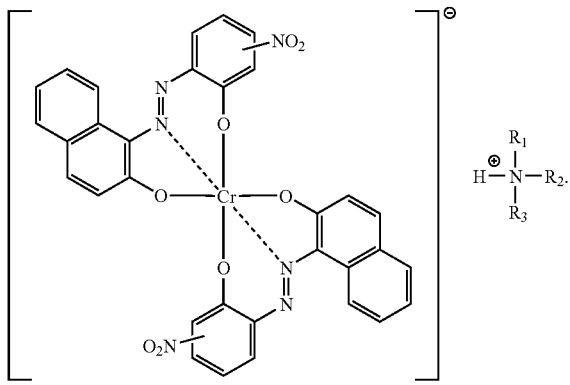

29. A colorant compound according to claim 1 wherein $R_1$, $R_2$, and $R_3$ each, independently of the others, are hydrogen atoms or alkyl groups, including linear and branched, saturated and unsaturated, cyclic and acyclic, and substituted and unsubstituted alkyl groups, and wherein hetero atoms, such as oxygen, nitrogen, sulfur, silicon, phosphorus, boron, and the like either may or may not be present in the alkyl group.

30. A colorant compound according to claim 29 wherein at least one of the alkyl groups is linear.

31. A colorant compound according to claim 29 wherein at least one of the alkyl groups is branched.

32. A colorant compound according to claim 29 wherein at least one of the alkyl groups is substituted.

33. A colorant compound according to claim 29 wherein at least one of the alkyl groups is unsubstituted.

34. A colorant compound according to claim 29 wherein at least one of the alkyl groups has hetero atoms therein.

35. A colorant compound according to claim 29 wherein at least one of the alkyl groups has no hetero atoms therein.

36. A colorant compound according to claim 29 wherein $R_1$, $R_2$, and $R_3$ are the same as each other.

37. A colorant compound according to claim 29 wherein at least two of $R_1$, $R_2$, and $R_3$ are different from each other.

38. A colorant compound according to claim 29 wherein all three of $R_1$, $R_2$, and $R_3$ are different from each other.

39. A colorant compound according to claim 29 wherein the compound is of the formula

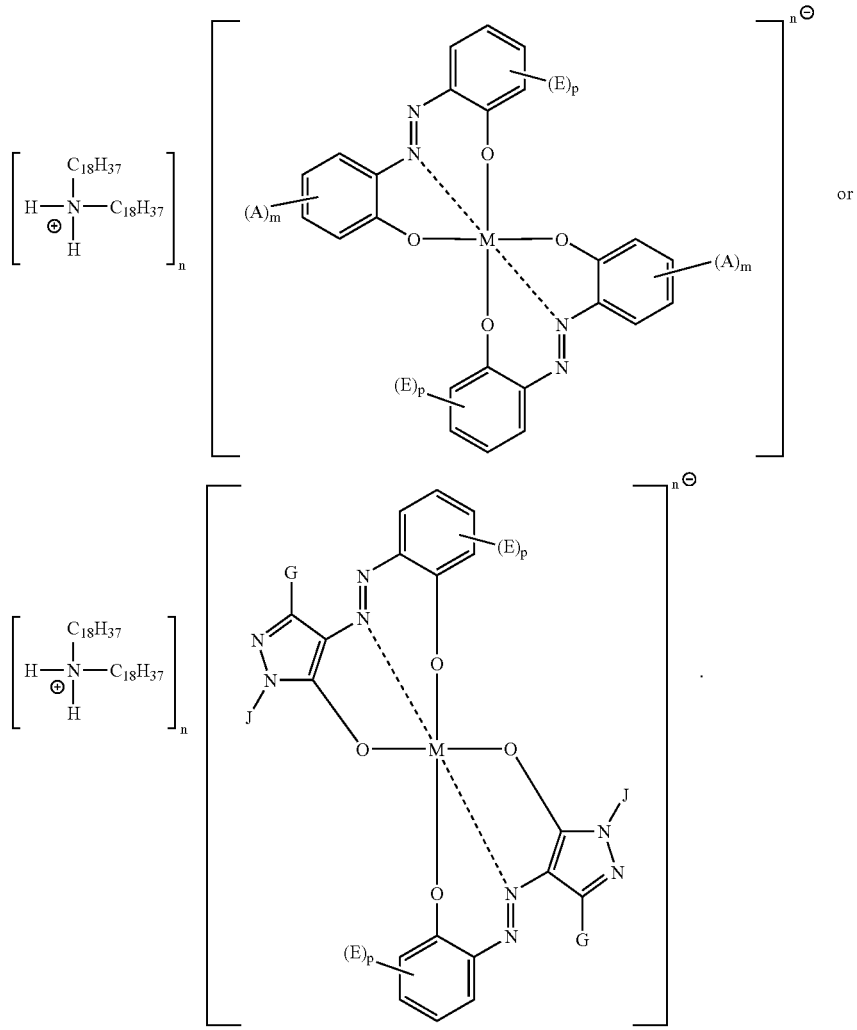

40. A colorant compound according to claim 29 wherein the compound is of the formula
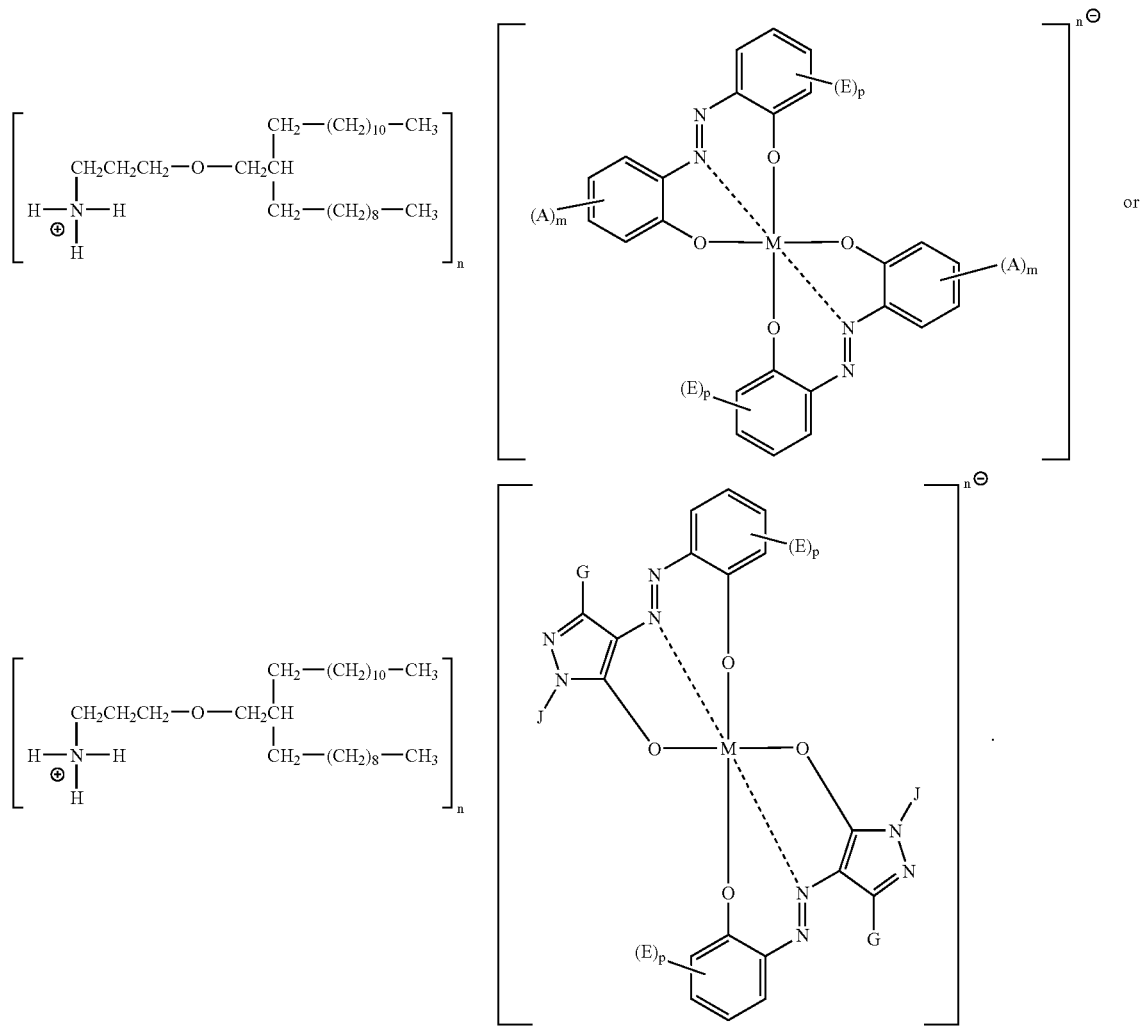
41. A colorant compound according to claim 29 wherein the compound is of the formula
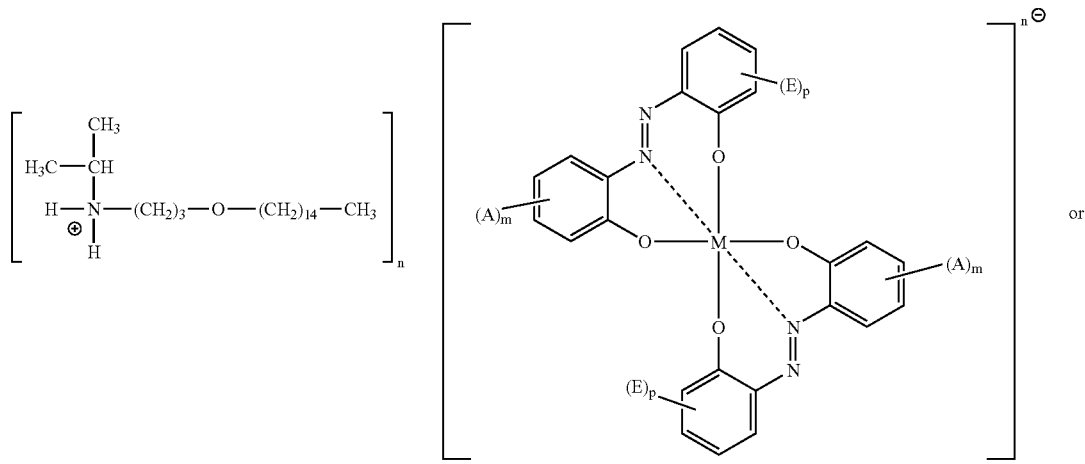

-continued
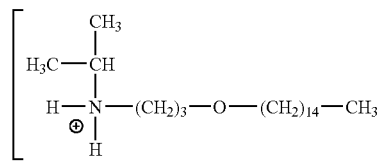 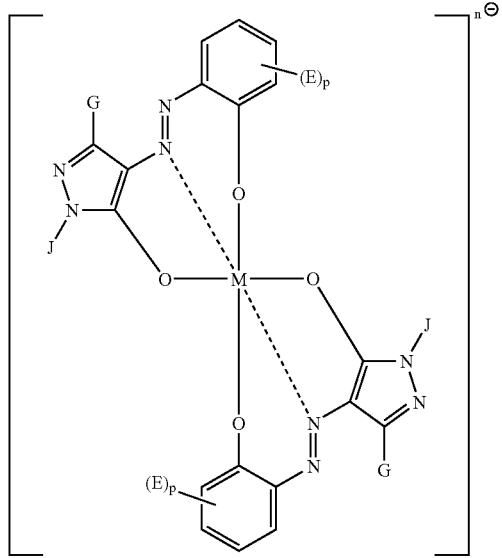
42. A colorant compound according to claim 29 wherein the compound is of the formula
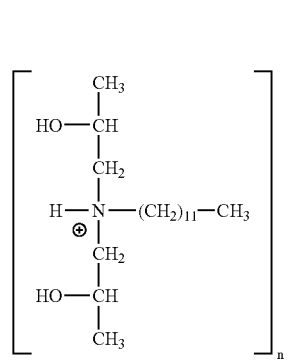 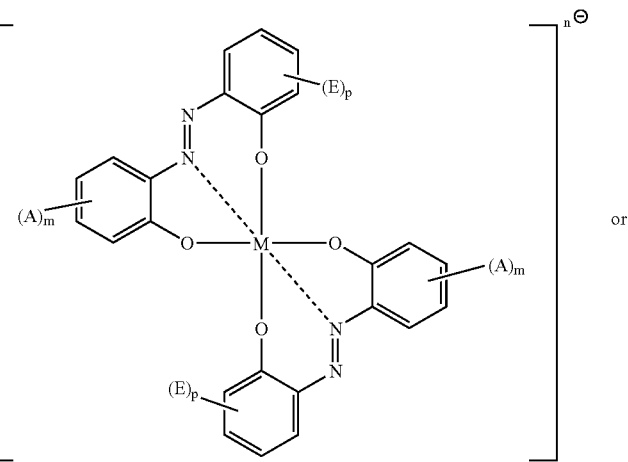 or
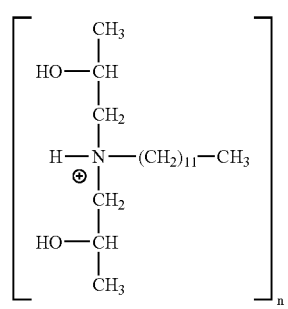 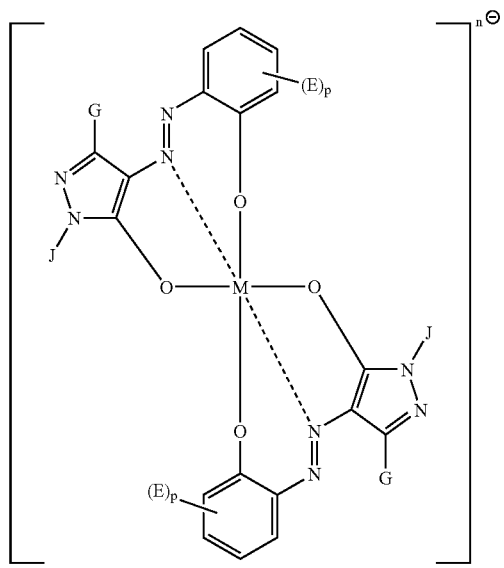

43. A colorant compound according to claim 29 wherein the compound is of the formula
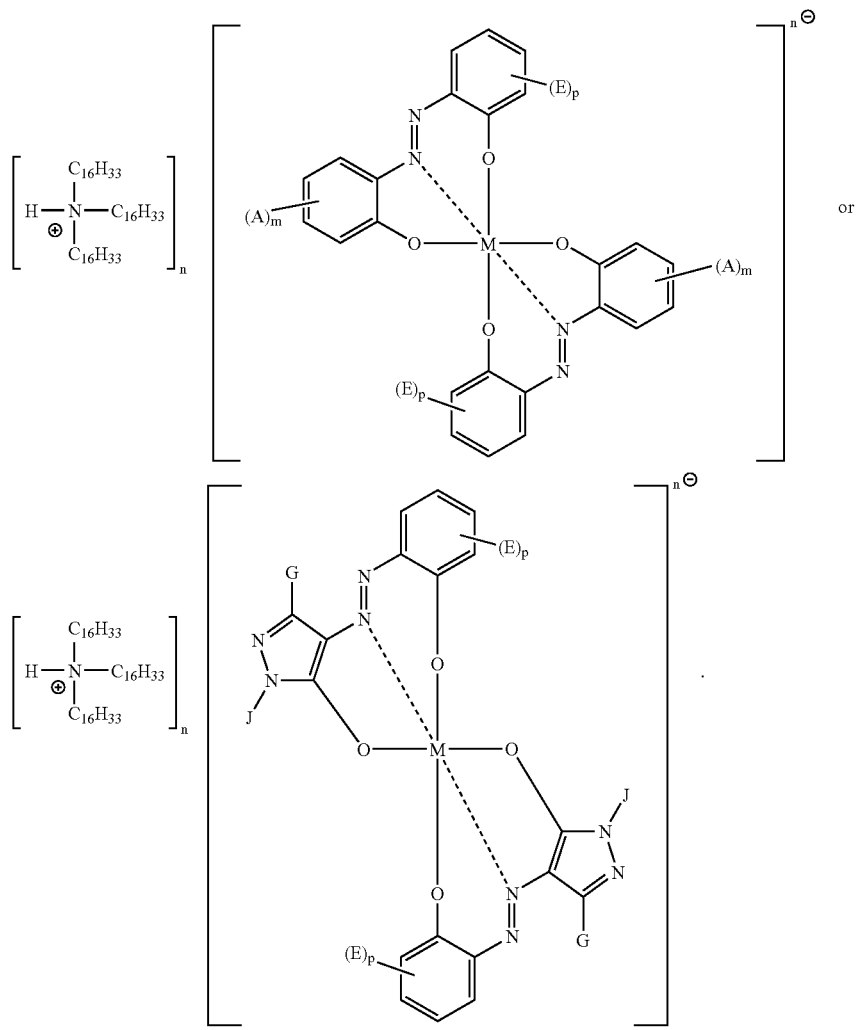
45
44. A colorant compound according to claim 29 wherein the compound is of the formula
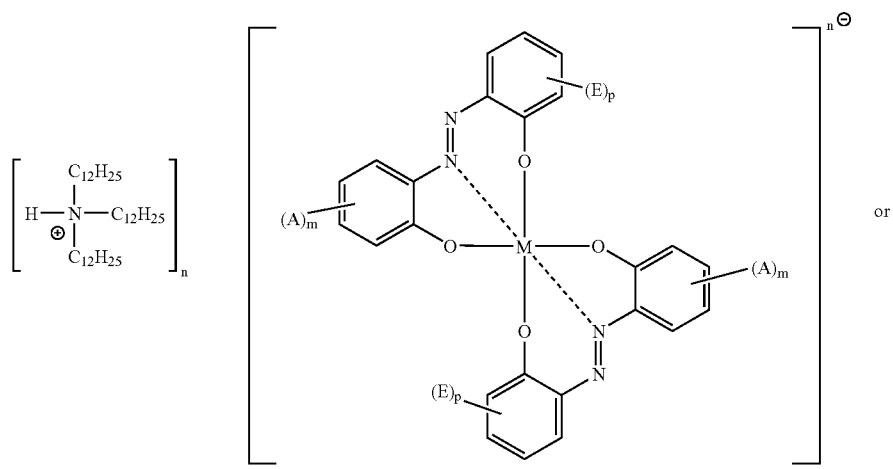

-continued

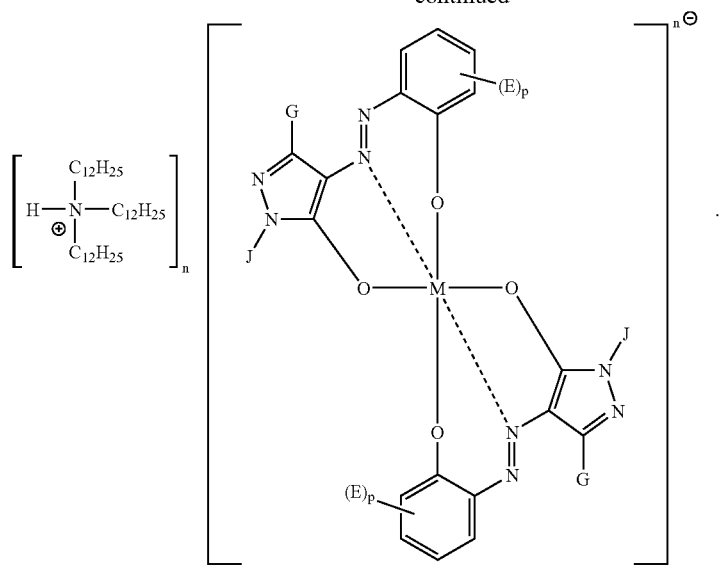

45. A colorant compound according to claim 1 wherein at least one of $R_1$, $R_2$, and $R_3$ is an aryl group, an arylalkyl group, or an alkylaryl group.

46. A colorant compound according to claim 45 wherein the aryl, arylalkyl, or alkylaryl group is substituted.

47. A colorant compound according to claim 45 wherein the aryl, arylalkyl, or alkylaryl group is unsubstituted.

48. A colorant compound according to claim 45 wherein the aryl, arylalkyl, or alkylaryl group contains at least one heteroatom therein.

49. A colorant compound according to claim 45 wherein the aryl, arylalkyl, or alkylaryl group contains no heteroatoms therein.

* * * * *